(12) United States Patent
Datta et al.

(10) Patent No.: US 6,207,756 B1
(45) Date of Patent: Mar. 27, 2001

(54) PRODUCT AND METHOD FOR MAKING POLYOLEFIN POLYMER DISPERSIONS

(75) Inventors: Sudhin Datta, Houston; Charles C. Cozewith, Bellaire; Bruce A. Harrington, Houston, all of TX (US)

(73) Assignee: Exxon Chemical Patents, Inc., Baytow, TX (US)

(*) Notice: Subject to any disclaimer, the term of this patent is extended or adjusted under 35 U.S.C. 154(b) by 0 days.

(21) Appl. No.: 09/260,966

(22) Filed: Mar. 1, 1999

Related U.S. Application Data

(60) Provisional application No. 60/076,713, filed on Mar. 4, 1998.

(51) Int. Cl.$^7$ .............................. C08F 8/00; C08L 23/00; C08L 23/04
(52) U.S. Cl. .......................... 525/191; 525/192; 525/193; 525/197; 525/198; 525/232; 525/240; 525/242; 525/244; 525/248
(58) Field of Search ..................................... 525/191, 192, 525/193, 197, 198, 232, 240, 242, 244, 248

(56) References Cited

U.S. PATENT DOCUMENTS

| | | |
|---|---|---|
| 3,378,606 | 4/1968 | Kontos . |
| 3,853,969 | 12/1974 | Kontos . |
| 4,742,106 | 5/1988 | Kamiya et al. . |
| 4,774,292 | 9/1988 | Thiersault et al. . |
| 4,966,944 | 10/1990 | Kiang . |
| 5,391,618 | 2/1995 | Yamamoto et al. . |
| 5,478,898 | 12/1995 | Standaert . |
| 5,504,172 | 4/1996 | Imuta et al. . |
| 5,710,219 | 1/1998 | Bates et al. . |

FOREIGN PATENT DOCUMENTS

| | | |
|---|---|---|
| 2157399 | 10/1995 | (CA) . |
| 0 067 525 | 12/1982 | (EP) . |
| 366411 | 5/1990 | (EP) . |
| 0 416 379 | 3/1991 | (EP) . |
| 0 714 923 | 6/1996 | (EP) . |
| 389611 B1 | 6/1997 | (EP) . |
| 1200 362 | 7/1970 | (GB) . |
| 4-337308 | 11/1992 | (JP) . |
| 92/15619 | 9/1992 | (WO) . |
| 93/13143 | 7/1993 | (WO) . |
| 94/17112 | 8/1994 | (WO) . |
| 96/33227 | 10/1996 | (WO) . |
| 97/36942 | 10/1997 | (WO) . |
| 98/02471 | 1/1998 | (WO) . |

OTHER PUBLICATIONS

Yamaguchi, et al—Journal of Applied Polymer Science, vol. 62, pg. 87–97 (1996) "Compatibility of Binary Blends of Polypropylene with Ethylene–α–olefin Copolymer".

Datta, et al.—Macromolecules, vol. 24, pg, 561–566 (1991); "Graft Copolymer Compatibilizers for Blends of Polypropylene and Ethylene–Propylene Copolymers".

"Acta Polymerica Sinica", vol. 2, pg. 125–130 (1987).

Pure and Applied Chemistry, vol. 56, pg. 625–634 (1984); "Molecular Characterization of Ethylene–Propylene Block Copolymers".

Datta et al., Macromolecules, vol. 26, pg. 2064–2076 (1993); "Graft Copolymer Compatibilizers for Blends of Isotactic Polypropylene and Ethylene–Propene Copolymers".

Lynch et al., ACS Division of Polymeric Materials: Science & Engineering, vol. 71, pg. 609–610 (1994); "The Effect of Interfacial Adhesion on the Izod Impact Strength . . . ".

*Primary Examiner*—Nathan M. Nutter
(74) *Attorney, Agent, or Firm*—A. R. Chi

(57) ABSTRACT

This invention relates to polyolefin polymer dispersions having a semicrystalline plastic (SP) component and an amorphous elastomer (AE) component. The polymer dispersions of this invention are characterized by a continuous phase containing a discontinuous phase (dispersed phase) as seen by FIG. 2. Embodiments of this invention include either: 1) a discontinuous phase composed of the SP component dispersed within a continuous phase composed of the amorphous elastomer component and/or, 2) a discontinuous phase composed of the amorphous elastomer dispersed within a continuous phase composed of the SP component.

18 Claims, 2 Drawing Sheets

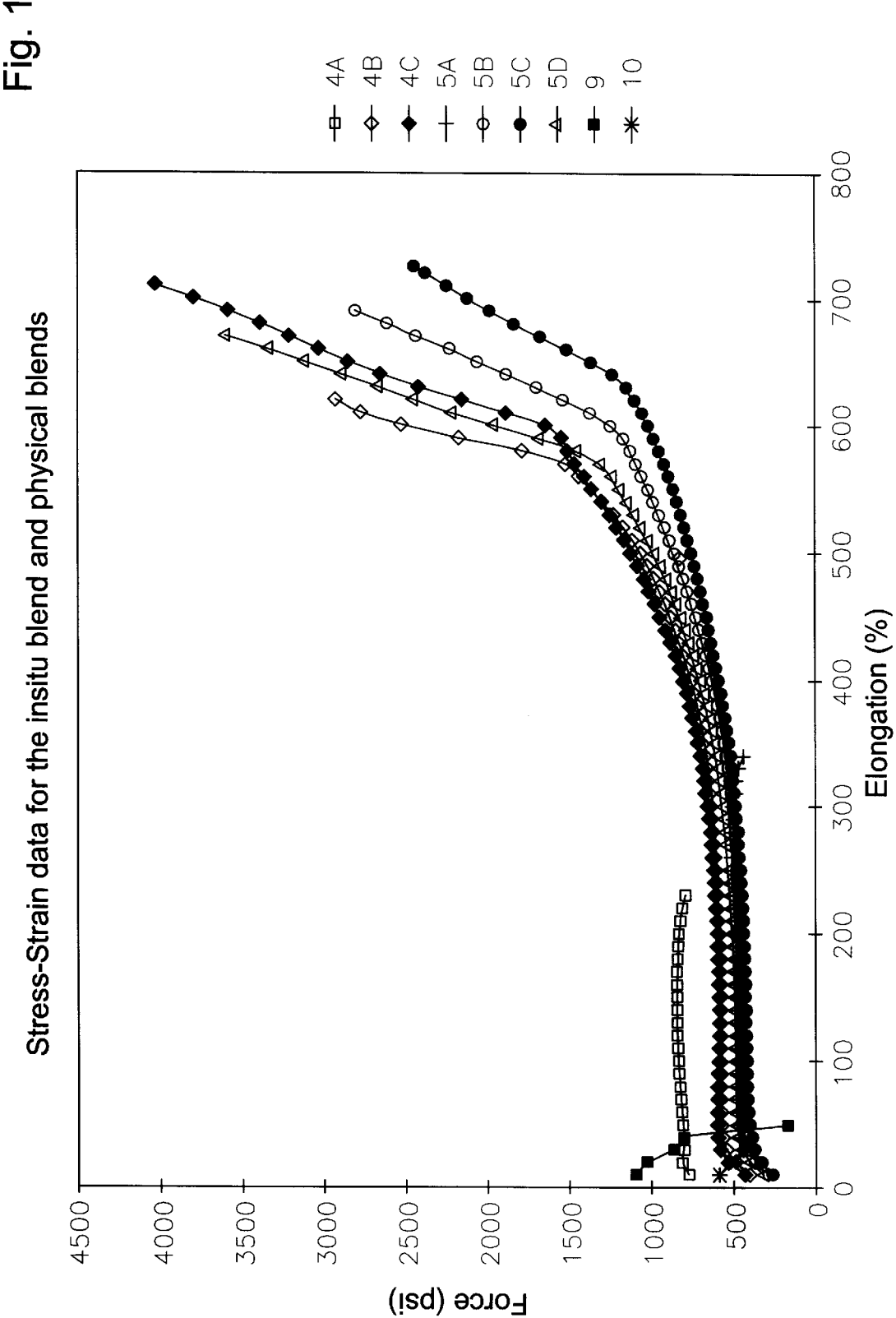

US 6,207,756 B1

PRODUCT AND METHOD FOR MAKING POLYOLEFIN POLYMER DISPERSIONS

Applicants claim the benefit of U.S. Provisional Application No. 60/076,713 filed on Mar. 4, 1998 as allowed by 35 USC §120

TECHNICAL FIELD

This invention relates to polyolefin polymer dispersions having a semicrystalline plastic (SP) component and an amorphous elastomer (AE) component. The polymer dispersions of this invention are characterized by a continuous phase containing a discontinuous phase (dispersed phase) as seen by FIG. 2. Embodiments of this invention include either: 1) a discontinuous phase composed of the SP component dispersed within a continuous phase composed of the amorphous elastomer component; and/or 2) a discontinuous phase composed of the amorphous elastomer dispersed within a continuous phase composed of the SP component.

BACKGROUND ART

Semicrystalline plastics and amorphous elastomers when mixed are normally immiscible and form a dispersion, i.e. a mixture of the two results in a polymer blend with the tendency of separating into distinct phases of uniform intraphase composition and distinct interphase composition. Physical mixing methods are common for creating such dispersions. An example of a physical method is making a semicrystalline plastic (SP) and amorphous elastomer (AE) separately and mixing the two in the molten state in an intensive, mixer such as a Brabender mixer.

Efforts have been directed at creating an intimate dispersion of SP and AE. "Intimate dispersion" is defined as intermingling of SP and AE components to a level finer than would be expected from mixing the components via physical methods. Intimate mixing is a measure of the surface area of contact between the dissimilar polymers and is related to the inverse of the physical size of the particulate dispersion of the two components of the mixture. Evidence of an intimate dispersion can be determined by a morphological examination of the polymer dispersion and is also apparent in the evaluation of the mechanical, thermal and solubility properties of the mixture. It is well known that the degree of mixing of normally immiscible polyolefin polymers affects the properties of physical blends of polymers. Highly dispersed mixtures give benefits in impact strength, toughness, and the depression in the ductile to brittle transition temperature of the blends. These improvements in the mechanical properties of a blend of polymers on increasing the interfacial surface area of contact and the consequent decrease in the particle size of the dispersion has been described in the book "Polymeric Compatibilizers: Uses and Benefits in Polymers Blends" by Datta, et al., Section 1 published by Hanser Verlag (1996). Because of the many benefits of intimate mixtures, a variety of methods have been used to attain intimate mixing of immicible polyolefin polymers.

One method of making intimate mixtures of SP and AE is disclosed by Yamaguchi, et al. in the *Journal of Applied Polymer Science* Volume 62, pp. 87–97 (1996) who teach that blends of polypropylene and copolymers of ethylene with alpha olefins containing greater than 3 carbon atoms, specifically butene and hexene, form intimate mixtures in certain specific composition ranges of the alpha olefin. Such a procedure was restricted to certain specific compositions since polymer dispersions composed of ethylene and propylene did not form intimate mixtures and neither did other copolymers of ethylene beyond the specified composition range. A similar set of data has been shown by U.S. Pat. No. 4,966,944, U.S. Pat. No. 4,742,106, U.S. Pat. No. 4,774,292, and U.S. Pat. No. 5,391,618.

A second method of making intimate mixtures comprising SP and AE is the use of vinyl unsaturation in a polymer made in the first reactor as a method to incorporate chemical links between the polymer made in the first and the second reactors and thus obtain an intimate mixture of polymer. Datta, et al., in a publication in the journal *Macromolecules* v 24, pp. 561–566 (1991) have shown the sequential polymerization of amorphous elastomer followed by a SP component. The polymer dispersion incorporates a diene monomer, vinyl norbornene and 3-butenyl norbornene being exemplified, which leave a pendant vinyl unsaturation on the polymer backbone material being made in the first polymerization reactor. The amount of the vinyl unsaturation is measured by infra red spectroscopic techniques and is estimated to be equivalent to 6 to 10 vinyl groups per polymer chain. The product of this sequential polymerization is intimately mixed only when dienes containing residual vinyl unsaturation are used. Addition of any other type of diene or the generation of a functionality which is not vinyl unsaturation does not lead to the formation of an intimate mixture of polyolefins. The use of such dienes can lead to highly branched structures which are undesirable in many end use applications.

A third method of making intimate mixtures comprising SP and AE is described by Feng et al. in the journal *Acta Polymerica Sinica* vol. 2, p125 (1987) wherein the AE consists of a broad composition distribution (CD), multicomponent mixture. Detailed analysis of the copolymer shows a continuum of the compositions which cover a range from polypropylene to polyethylene. This feature has been discussed by Simonazzi in a paper in the journal *Pure and Applied Chemistry* v. 56, p 625 (1984). These intimate blends of SP and AE are different from the blends of the present invention in the broad compositional range of the AE. Also, they are not synthesized in a solution polymerization process.

A fourth method of making intimate mixtures comprising SP and AE is by addition of a polymeric compatibilizer. For example, Datta, et al., in *Macromolecules* v. 26, p2064 (1993), and Kontos in U.S. Pat. Nos. 3,853,969 and 3,378,606, disclose the formation of blends of isotactic polypropylene as an SP component and an AE composed of copolymers of propylene with ethylene and hexene. These polymer blends are intimate mixtures but their formation requires the use of a compatibilizer such as a branched polymer in the case of Datta, et al., or a linear multiblock polymer in the case of Kontos. The blends are not intimately mixed in the absence of the compatibilizer.

A fifth method of making intimate mixtures comprising SP and AE is disclosed by Lynch, et al., in *ACS Division of Polymeric Materials: Science and Engineering—Preprints* v. 71, 609 (1994) who carefully coprecipitate a solution of AE (an ethylene propylene copolymer) and a SP (polypropylene). However, such a method makes a product which is not thermodynamically stable in the degree of intimate mixing since on heating for a short period of time above the melting point of the polypropylene, the degree of mixing of the phases deteriorates to that corresponding to a simple mixture of preformed polypropylene and amorphous ethylene propylene copolymer.

SUMMARY

The intimate mixtures of this invention comprising semicrystalline plastic (SP) and amorphous elastomer (AE) do not require any of the previously discussed methods to achieve an intimate mixture of polyolefins and have an improved level of intimate dispersion.

This invention's method of making an intimate dispersion comprises: a) feeding solvent and a first set of monomers in predetermined proportions to a first reactor, b) adding a soluble metallocene catalyst to said first reactor, c) polymerizing the first set of monomers in solution to produce an effluent containing a first polymer, d) feeding the effluent to a second reactor, e) feeding a second set of monomers in predetermined proportions to a second reactor with optionally additional solvent and catalyst, f) polymerizing the second set of monomers in solution in the presence of the first polymer to produce a second polymer wherein: a) the first and second set of monomers are chosen from the group ethylene, alpha-olefin, non-conjugated diene, b) one of the two polymers is an SP having a melting point greater than 60° C., c) the other polymer is an AE copolymer with 20–70 wt. % ethylene and having a melting point less than 60° C., d) the first polymer contains less than 0.2 vinyl groups per chain, e) and the first and second polymer are incompatible and form a two phase mixture.

The product of this invention is a polymer dispersion essentially free of added compatibilizer comprising a polymer dispersion having a MW of at least 20,000, and a semicrystalline plastic having a MW of at least 20,000; wherein said amorphous elastomer and said semicrystalline plastic are made from monomers selected from the group consisting of ethylene, C3–C20 higher alpha-olefin, a non-conjugated diene, and combinations thereof, wherein neither said amorphous elastomer or said semicrystalline plastic has more than 0.2 pendant vinyl groups per chain; wherein said polymer dispersion has a value of factor A (defined below) which is less than 1. In preferred embodiments factor A is less than 0.6, most preferred less than 0.4.

The product also has a factor B (defined below) which is greater than 2, preferably greater than 3, and most preferably greater than 4.

When the polymer dispersion is an AE dispersed within an SP, then the AE is composed of monomers selected from ethylene, C3–C20 higher alpha-olefin, non-conjugated diene, and combinations thereof, and SP is composed of monomers selected from ethylene, C3–C20 higher alpha-olefin, non-conjugated diene, and combinations thereof. When the polymer dispersion is an SP dispersed within an AE, then the SP is composed of monomers selected from the group consisting of ethylene, C3–C20 higher alpha olefin, non-conjugated diene, and combinations thereof, and AE is made from monomers selected from ethylene, C3–C20 higher alpha olefin, and combinations thereof.

BRIEF DESCRIPTION OF THE DRAWINGS

FIG. 1 is a graph showing the force required to produce elongation of several polymers of this invention.

DETAILED DESCRIPTION

Figure 2A:
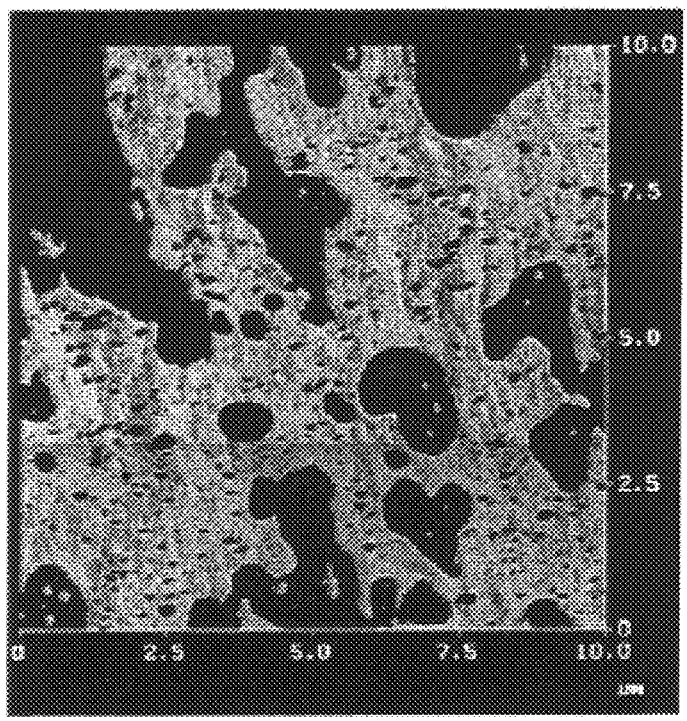
FIG. 2 is a TEM micrograph of a polyolefin polymer dispersion of this invention.
Figure 2B:
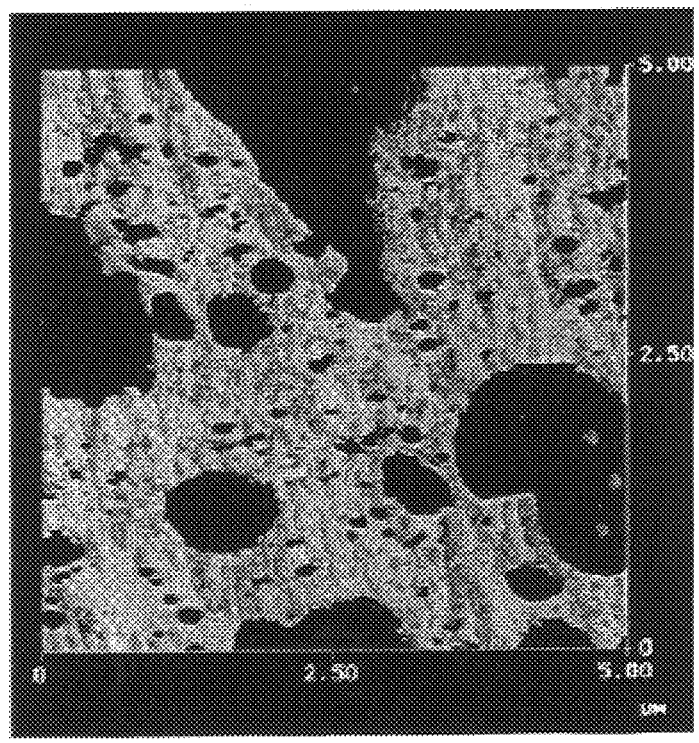

This invention's polymer dispersion of semicrystalline plastic (SP) and amorphous elastomer (AE) is composed entirely of polymerized olefins. These olefins include ethylene and higher alpha olefins with 3 to 20 carbon atoms as well as optional amounts of non-conjugated diene and may be present in either the SP or AE. Dienes, if present, preferably compose 10 mole % or less of the polymer dispersion.

The semicrystalline plastic (SP) consists of a single compositionally homogeneous polymer with a uniform intramolecular composition as determined by differential solvent extraction as described in the examples and in the publication *Macromolecules* (1989), v. 22, p. 861 by Steskal, J. Strakova, D., et al. The SP has a molecular weight distribution such that the polydispersity index (PDI), i.e. Mn/Mw, is less than 5.0, as determined by gel permeation chromatography. The preferred PDI is between 1.8 and 3.0. The SP has a melting point, Tm, as measured by differential scanning calorimetry (DSC) of above 60° C., preferably above 80° C., and most preferably above 100° C. The SP has a heat of fusion of at least 10 J/g, preferably 20 J/g, and most preferably at least 30 J/g. The heat of fusion of the SP is preferably 10 J/g higher than that of the AE. More preferably the heat of fusion of the SP is 20 J/g higher than that of the AE. The SP has crystallinity arising from long sequences of ethylene or stereoregular C3–C20 alpha olefins in the chain and, therefore, is preferably polypropylene, polyethylene, or copolymers thereof. The SP may contain a diene selected from those known in the art to be useful for vulcanization of polymers. Diene content may range from 0 to 10 mol %, preferably 0–5 mol %, and most preferably 0–3 mol %.

When the SP is polypropylene or a polymer predominately of propylene, propylene is present in either isotactic or syndiotatic sequences. When the SP is an ethylene/propylene copolymer where propylene is predominant, generally propylene must be present at greater than 80 wt % in order to have a melting point and heat of fusion as described above. When SP is a copolymer, where propylene is predominant, the amount of propylene may range from 80–100 wt % propylene, and most preferably 85–98 wt % propylene.

When the SP is an ethylene/propylene copolymer where ethylene is predominant, generally ethylene must be present at greater than 65 wt % in order to have a melting point and heat of fusion as described above. The minimum amount of ethylene will be a function of the comonomer used and the catalyst system, and so is somewhat variable and may range from 65–100 wt % ethylene, and most preferably 85–98 wt % ethylene.

Reactor conditions may be varied as set forth below in order to achieve this invention's description of semicrystalline plastic.

The amorphous elastomer (AE) is a homogenous polymer with a uniform intramolecular composition as determined by differential solvent extraction and has a PDI of less than 5.0, as determined by gel permeation chromatography. The preferred PDI is between 1.8 and 3.0. The AE is composed of ethylene, C3–C20 alpha olefins and optionally, non-conjugated diene and has a melting point by DSC below 60° C., more preferably below 55° C., and most preferably below 45° C. The heat of fusion of the AE is not more than 15 J/g, preferably not more than 10 J/g, and most preferably less than 5 J/g. The AE component of the polymer dispersion is a copolymer of ethylene and an C3–C20 alpha olefin having 20–70 wt % ethylene with the proviso that the ethylene content of the AE differs from that of the SP component by at least 5 wt % ethylene, and more preferably 10 wt % ethylene. The AE may contain a diene selected from those well-known in the art to be useful for the vulcanization of polymers. Diene contents can range from 0 to 10 mol %, preferably from 0–5%, and most preferably from 0 to 3 mol %.

Reactor conditions may be varied as set forth below in order to achieve this invention's description of amorphous elastomer.

In the preferred mode of the practice of the invention, the SP is a polyolefin copolymer containing less than 20 wt % comonomer while the AE is a copolymer comprising two or more olefins.

The ratio of AE to SP may vary depending upon the desired properties of the polymer dispersion for specific applications. This ratio varies between 1/99 to 99/1 by weight with the preferred range of 10/90 to 90/10. In general the SP comprises 5–95 wt % of the polymer dispersion but preferably comprises at least 45 wt % and most preferably at least 25 wt %.

The molecular weight of the SP and AE may vary widely depending upon the desired properties of the polymer dispersion for specific applications. Number average molecular weights of 20,000 to 2,000,000 are suitable. As is well known to those skilled in the art, the molecular weight of each component and the amount of each component can be controlled to produce a specified molecular weight and molecular weight distribution in the final blend. Particularly noteworthy is that the SP and AE form the intimate dispersion of this invention even though the molecular weights of SP and AE are above their entanglement molecular weight. It is well understood that polymeric mixtures can be made to be intimately dispersed at molecular weights substantially lower than those mentioned above.

REACTOR CONDITIONS

The polymer dispersions described in this invention are made in a solution polymerization process using a train of reactors, herein also referred to as series reactors. The train of reactors contains at least two polymerization reactors connected in series where the individual components of SP and AE are made in separate reactors.

Copending U.S. Application Nos. 60/076,712 filed on Mar. 4, 1998 and 60/076,841 filed on Mar. 4, 1998 disclose suitable methods of making the polymer dispersions of this invention and are hereby incorporated by reference for U.S. patent practice.

Typically, a first reactor is operated to polymerize a first polymer component in solution and the reactor effluent from the first reactor is introduced, in whole or in part, into the feed of a subsequent reactor which is operated to polymerize a second polymer component. This ensures that the second polymer component, made in the second reactor, is made in the presence of the polymeric product made in the first reactor. In a preferred mode of operation, the SP is made in a first reactor and the AE is made in a second reactor in the presence of the SP, but alternatively, the AE may be made in a first reactor and the SP in a second reactor. As long as carryover of monomer from the first reactor does not give a comonomer concentration in the second reactor too high to produce a SP of the desired composition in the desired amount.

The polymer dispersions of this invention may be made by solution polymerization in a train of at least two continuous flow stirred tank reactors (CFSTR) connected in series with the addition of a metallocene catalyst. Each reactor should be capable of being fed independently with monomer and solvent. In order to remove polar compounds that act as catalyst poisons, all solvent and monomer feeds are desirably purified over molecular sieves, alumina beds, or other absorbents as known in the art. While more than two reactors can be used in the train, preferably two CFSTRs are used with the catalyst only being added to the first reactor with no further addition of catalyst. Heat removal from the reactor is by methods well known in the art such as auto-refrigeration, feed prechilling (adiabatic reactors), cooling coils, or various combinations of these techniques. Adiabatic reactors with prechilled feeds are preferred.

Pressure must be sufficient to keep the reactor contents in solution at the reactor temperature. Polymerization may be carried out at temperatures in the range of about −20° C. or lower to about 200° C. or higher, and preferably, at 0° C. to 160° C. Most preferably polymerization is conducted in a range of about 55° C. to 140° C. because the energy requirements for both recovering the polymer from solution and cooling the reactor during polymerization are reduced. The residence time per reactor is maintained at 1 to 180 minutes and preferably at 5 to 30 minutes. The polymer concentration in the effluent of the reactors is maintained in the range of 1 to 20% by weight and more preferably between 3 to 12% by weight.

The overall polymerization rate is set by the catalyst and monomer feed rates. Polymer composition is controlled by adjusting the monomer feed rate to a reactor. Polymer molecular weight is set by choosing the reactor temperature, (MW decreases with temperature increases), monomer concentration (MW increases with increasing monomer concentration), and by optionally adding chain transfer agents such as hydrogen.

The polymer product can be conventionally recovered from the effluent by coagulation with a nonsolvent such as isopropyl alcohol, acetone, or n-butyl alcohol, or the polymer can be recovered by stripping the solvent or other media with heat or steam. One or more conventional additives such as antioxidants can be incorporated in the polymer during the recovery procedure. Possible antioxidants include phenyl-beta-naphthylamine; di-tert-butylhydroquinone, triphenyl phosphate, heptylated diphenylamine, 2,2'-methylene-bis (4-methyl-6-tert-butyl)phenol, and 2,2,4-trimethyl-6-phenyl-1,2-dihydroquinoline.

Polymerization may be conducted by any of the polymerization procedures known in the art, however, it is essential that the polymerization of both the AE and the SP be conducted in a solution polymerization under conditions where both of the components are completely in solution. These polymerization conditions are obtained by the choice of a solvent, in sufficient quantity, common to both of the polymeric components as the polymerization medium at suitable reaction conditions, including temperature and pressure, such that all of the components of the polymer mixture are maintained in solution. Illustrative of solvents for making polymers of this invention are hydrocarbons such as aliphatics, cycloalphatics, and aromatic hydrocarbons. Preferred solvents are C12 or lower straight-chain or branched-chain, saturated hydrocarbons, and C5 to C9 saturated alicyclic or aromatic hydrocarbons. Examples of such solvents or reaction media are hexane, butane, pentane, heptane, cyclopentane, cyclohexane, cycloheptane, methyl cyclopentane, methyl cyclohexane, isooctane, benzene, toluene, and xylene, with hexane preferred.

The monomers used in this invention are ethylene, higher alpha-olefins (C3–C20), and non-conjugated dienes.

The most preferred higher alpha olefin is propylene, although other higher alpha olefins may be used as set forth below. Higher alpha-olefins suitable for use may be branched or straight chained, cyclic, and aromatic substituted or unsubstituted, and are preferably C3–C18 alpha-olefins. Illustrative non-limiting examples of preferred higher alpha-olefins are propylene, 1-bitene, 1-pentene, 1-hexene, 1-octene, and 1-dodecene. Mixed alpha-olefins can be used as well as mixed alpha and non-alpha olefins (e.g., mixed butenes) as long as any non-polymerizable olefins in the mixture act as inerts towards the catalyst. Illustrative of such substituted higher alpha-olefins are compounds of the formula $H_2C=CH-(CH_2)_n X$ wherein n is an integer from 1 to 30 carbon atoms (preferably to 10 carbon atoms), and X preferably comprises CH3 but can comprise aryl, alkaryl, or cycloalkyl substitutents. Also useful are higher alpha-olefins substituted by one or more such X substituents wherein the substituent(s) are attached to a non-terminal carbon atom, more preferably being attached to a non-terminal carbon atom which is preferably 2 to 30 carbons removed from the terminal carbon atom, with the proviso that the carbon atom so substituted is preferably not in the 1- or 2-carbon position in the olefin. The higher alpha-olefins, when substituted, are preferably not substituted with aromatics or other bulky groups on the 2-carbon position since aromatic and bulky groups interfere with the subsequent desired polymerization.

Although 5-ethylidene-2-norborene (ENB) is the most preferred non-conjugated diene to be used in the invention, other non-conjugated dienes are useful as set forth below. Non-conjugated dienes useful as co-monomers preferably are straight chain, hydrocarbon di-olefins or cycloalkenyl-substituted alkenes, having about 6 to about 15 carbon atoms, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; 3,7-dimethyl-1,7-octadiene; and the mixed isomers of dihydro-myricene and dihydro-ocinene; (c) single ring alicyclic dienes, such as 1,3-cyclopentadiene; 1,4-cyclohexadiene; 1,5-cyclo-octadiene and 1,5-cyclododecadiene; (d) multi-ring alicyclic fused and bridged ring dienes, such as tetrahydroindene; nonboradiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); (e) cycloalkenyl-substituted alkenes, such as allyl cyclohexene, vinyl cyclooctene, allyl cyclodecene, vinyl cyclododecene. Of the non-conjugated dienes typically used, the preferred dienes are dicyclopentadiene, 1,4-hexadiene, 5-methylene-2-norbornene, and 5-ethylidene-2-norbornene, and tetracyclo (Δ-11,12) 5,8 dodecene. Particularly preferred diolefins are 5-ethylidene-2-norbornene (ENB), 1,4-hexadiene, dicyclopentadiene (DCPD), and 5-vinyl-2-norbornene (VNB). Note that throughout this application the terms "non-conjugated diene" and "diene" are used interchangeably.

The conditions for the polymerization are chosen such that the component polymer made in the first reactor is substantially free of vinyl unsaturation. Vinyl unsaturation is defined by the structure $R_1$—C($R_2$—$R_3$)—CH=CH$_2$, wherein R, $R_2$ and $R_3$ are hydrocarbon moieties either pendant to or at the end of the chain. Vinyl unsaturation in the chain occurs by a variety of processes such as the addition of comonomers which contain this functionality in or by mechanism of termination of the chain which leads to this functionality. Vinyl unsaturation introduced by the use of diene comonomer will typically be pendant to the main chain while vinyl unsaturation arising from chain transfer processes will typically be present at the end of a chain. Vinyl unsaturation in the polymer produced in the first polymerization step may lead to formation of intimate mixtures with the polymer produced in the subsequent polymerization reactors by copolymerization of the vinyl unsaturation terminated polymer as a macromonomer in the second polymerization as shown in the discussion of the prior art described below. Vinyl unsaturation is measured by a variety of spectroscopic techniques such as infra red or nuclear magnetic resonance spectroscopy and substantially absent levels of vinyl functionality is defined as less than 0.20 vinyl groups per chain.

An example of a polymerization suitable for making this invention's polymer dispersions comprises: (a) a single metallocene polymerization catalyst, introduced into a first reactor only, activated by any of the procedures known in the art, capable of making both the SP component as well as the AE, (b) a polymerization solvent such as hexane sufficient to dissolve all of the polymer produced during polymerization, (c) polymerization temperatures in the range of 0° C. to 200° C. such that all of the polymeric components are soluble, (d) pressure in the range of 2 to 100 bar(0.2 to 10 MPa) such that the polymerization solvent is retained as a liquid and, (e) a train of two continuous flow stirred tank polymerization reactors where the SP is made in the first reactor and the AE is made in the second reactor. If the SP is not polyethylene, then a metallocene catalyst capable of stereospecific polymerization must be used.

The catalyst system described below and used by this invention is a group 4, 5, or 6 metallocene with an activator such as a non-coordinating anion (NCA) or methylalumoxane (MAO), and optionally a scavenging compound. If the SP is predominately propylene (greater than 80 wt %), then the catalyst system can preferably be capable of polymerizing propylene stereospecifically. With certain catalyst systems and ethylene-propylene monomers feeds, propylene conversion decreases as temperature increases. Preferred catalyst systems; of this invention are those where the propylene to ethylene conversion ratios remain substantially unchanged as reaction temperature increases up to about 190° C.

The term "metallocene" and "metallocene catalyst precursor" as used herein shall be understood to refer to compounds possessing a transition metal M, with a cyclopentadienyl (Cp) ligand or ligands, at least one non-cyclopentadienyl-derived ligand X, and zero or one heteroatom-containing ligand Y, the ligands being coordinated to M and corresponding in number to the valence thereof. The metallocene catalyst precursors are generally neutral complexes but when activated with a suitable co-catalyst (referred to as activator) yield an active metallocene catalyst which refers generally to an organometallic complex with a vacant coordination site that can coordinate, insert, and polymerize olefins. The metallocene catalyst precursor is preferably one of, or a mixture of metallocene compounds of either or both of the following types:

1) Cyclopentadienyl (Cp) complexes which have two Cp ring systems for ligands. The Cp ligands form a sandwich complex with the metal and can be free to rotate (unbridged) or locked into a rigid configuration through a bridging group. The Cp ring ligands can be like or unlike, unsubstituted, substituted, or a derivative thereof such as a heterocyclic ring system which may be substituted, and the substitutions can be fused to form other saturated or unsaturated ring systems such as tetrahydroindenyl, indenyl, or fluorenyl ring systems. These cyclopentadienyl complexes have the general formula

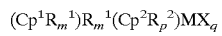

wherein Cp$^1$ of ligand (Cp$^1$R$_m^1$)and Cp$^2$ of ligand (Cp$^2$R$_p^2$) are the same or different cyclopentadienyl rings, R$^1$ and R$^2$ each is, independently, a halogen or a hydrocarbyl, halocarbyl, hydrocarbyl-substituted organometalloid or halocarbyl-substituted organometalloid group containing up to about 20 carbon atoms, m is 0 to 5, p is 0 to 5, and two R$^1$ and/or R$^2$ substituents on adjacent carbon atoms of the cyclopentadienyl ring associated there with can be joined together to form a ring containing from 4 to about 20 carbon atoms, $R^3$ is a bridging group, n is the number of atoms in the direct chain between the two ligands and is 0 to 8, preferably 0 to 3, M is a transition metal having a valence of from 3 to 6, preferably from group 4, 5, or 6 of the periodic table of the elements and is preferably in its highest oxidation state, each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, and q is equal to the valence of M minus 2.

2) Monocyclopentadienyl complexes which have only one Cp ring system as a ligand. The Cp ligand forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from group VA or VIA of the periodic table of the elements. These mono-cyclopentadienyl complexes have the general formula $$(Cp^1R_m^1)R_n^3(Y,R^2)MX_s$$

wherein $R^1$ is, each independently, a halogen or a hydrocarbyl, halocarbyl, hydrocarbyl-substituted organometalloid or halocirbyl-substituted organometalloid group containing up to about 20 carbon atoms, "m" is 0 to 5, and any two $R^1$ substituents on adjacent carbon atoms of the cyclopentadienyl ring associated there with can be joined together to form a ring containing from 4 to about 20 carbon atoms, $R^3$ is a bridging group, "n" is the number of atoms in the direct chain between the two ligands, and is 0 to 8, preferably 0 to 3, M is a transition metal having a valence of from 3 to 6, preferably from group 4, 5, or 6 of the periodic table of the elements and is preferably in its highest oxidation state, Y is a heteroatom containing group in which the heteroatcm is an element with a coordination number of three from Group VA or a coordination number of two from group VIA, preferably nitrogen, phosphorous, oxygen, or sulfur, $R^2$ is a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and when Y is three coordinate and unbridged there may be two $R^2$ groups on Y each independently a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, and "s" is equal to the valence of M minus 2.

Examples of suitable biscyclopentadienyl metallocenes of the type described in group 1 above for the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614, all of which are incorporated by reference herein.

Illustrative, but not limiting examples of preferred biscyclopentadienyl metallocenes of the type described in group 1 above for the invention are the racemic isomers of:

μ-$(CH_3)_2$Si(indenyl)$_2$M(Cl)$_2$
μ-$(CH_3)_2$Si(indenyl)$_2$M(CH$_3$)$_2$
μ-$(CH_3)_2$Si(tetrahydroindenyl)$_2$M(Cl)$_2$
μ-$(CH_3)_2$Si(tetrahydroindenyl)$_2$M(CH$_3$)$_2$
μ-$(CH_3)_2$Si(indenyl)$_2$M(CH$_2$CH$_3$)$_2$
μ-$(C_6H_5)_2$C(indenyl)$_2$M(CH$_3$)$_2$;

wherein M is chosen from a group consisting of Zr, Hf, and Ti.

Examples of suitable unsymmetrical cyclopentadienyl metallocenes of the type described in group 1 above for the invention are disclosed in U.S. Pat. Nos. 4,892,851; 5,334,677; 5,416,228; and 5,449,651; and are described in publication *J Am. Chem. Soc.* 1988, 110, 6255, all of which are incorporated by reference herein.

Illustrative, but not limiting examples of preferred unsymmetrical cyclopentadienyl metallocenes of the type described in group 1 above for the invention are:

μ-$(C_6H_5)_2$C(cyclopentadienyl)(fluorenyl)M(R)$_2$
μ-$(C_6H_5)_2$C(3-methylcyclopentadienyl)(fluorenyl)M(R)$_2$
μ-$(CH_3)_2$C(cyclopentadienyl)(fluorenyl)M(R)$_2$
μ-$(C_6H_5)_2$C(cyclopentadienyl)(2-methylindenyl)M(R)$_2$
μ-$(C_6H_5)_2$C(3-methylcyclopentadienyl)(2-methylindenyl)M(R)$_2$
μ-$(C_6H_5)_2$C(cyclopentadienyl)(2,7-dimethylfluorenyl)M(R)$_2$
μ-$(CH_3)_2$C(cyclopentadienyl)(2,7-dimethylfluorenyl)M(R)$_2$;

wherein M is chosen form a group consisting of Zr and Hf, and R is chosen from a group consisting of Cl and CH$_3$.

Examples of suitable monocyclopentadienyl metallocenes of the type described in group 2 above for the invention are disclosed in U.S. Pat. Nos. 5,026,798; 5,057,475; 5,350,723; 5,264,405; 5,055,438 and are described in publication WO 96/002244, all of which are incorporated by reference herein.

Illustrative, but not limiting examples of preferred monocyclopentadienyl metallocenes of the type described in group 2 above for the invention are:

μ-$(CH_3)_2$Si(cyclopentadienyl)(1-adamantylamido)M(R)$_2$
μ-$(CH_3)_2$Si(3-tertbutylcyclopentadienyl)(1-adamantylamido)M(R)$_2$
μ-$(CH_2$(tetramethylcyclopentadienyl)(1-adamantylamido)M(R)$_2$
μ-$(CH_3)_2$Si(tetramethylcyclopentadienyl)(1-adamantylamido)M(R)$_2$
μ-$(CH_3)_2$C(tetramethylcyclopentadienyl)(1-adamantylamido)M(R)$_2$
μ-$(CH_3)_2$Si(tetramethylcyclopentadienyl)(1-tertbutylamido)M(R)$_2$
μ-$(CH_3)_2$Si(fluorenyl)(1tertbutylamido)M(R)$_2$
μ-$(CH_3)_2$Si(tetramethylcyclopentadienyl)(1-cyclododecylamido)M(R)$_2$
μ-$(C_6H_5)_2$C(tetramethylcyclopentadienyl)(1-cyclododecylamido)M(R)$_2$;

wherein M is selected from a group consisting of Ti, Zr, and Hf and wherein R is selected from a group consisting of Cl and CH$_3$.

Another class of organometallic complexes that are useful catalysts for the process described herein are those with diimido ligand systems such as those described in WO 96/23010 assigned to Du Pont, incorporated herein by reference for U.S. Patent practice.

Non-coordinating Anions

The term "non-coordinating anion" means an anion which either does not coordinate to said transition metal cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization. Additionally, the anions useful in this invention will be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to about 4 angstroms.

Descriptions of ionic catalysts for coordination polymerization comprised of metallocene cations activated by non-coordinating anions appear in the early work in EP-A-0 277 003, EP-A-0 277 004, U.S. Pat. Nos. 5,198,401 and 5,278,119, and WO92/00333. These teach a preferred method of preparation wherein metallocenes (bisCp and monoCp) are protonated by an anionic precursor such that an alkyl/hydride group is abstracted from a transition metal to make it both cationic and charge-balanced by the non-coordinating anion. The use of ionizing ionic compounds not containing an active proton but capable of producing both the active metallocene cation and a non-coordinating anion is also known. See, EP-A-0 426 637, EP-A-0 573 403 and U.S. Pat. No. 5,387,568. Reactive cations other than Bronsted acids capable of ionizing the metallocene compounds include ferrocenium triphenylcarbonium and triethylsilylinium cations. Any metal or metalloid capable of forming a coordination complex which is resistant to degradation by water (or other Bronsted or Lewis Acids) may be used or contained in the anion of the second activator compound. Suitable metals include, but are not limited to, aluminum, gold, platinum and the like. Suitable metalloids include, but are not limited to, boron, phosphorus, silicon and the like. The description of non-coordinating anions and precursors thereto of these documents are incorporated by reference for purposes of U.S. patent practice.

An additional method of making the ionic catalysts uses ionizing anionic pre-cursors which are initially neutral Lewis acids but form the cation and anion upon ionizing reaction with the metallocene compounds for example tris (pentafluorophenyl) boron acts to abstract an alkyl, hydride or silyl ligand to yield a metallocene cation and stabilizing non-coordinating anion, see EP-A-0 427 697 and EP-A-0 520 732. Ionic catalysts for addition polymerization can also be prepared by oxidation of the metal centers of transition metal compounds by anionic precursors containing metallic oxidizing groups along with the anion groups, see EP-A-0 495 375. The description of non-coordinating anions and precursors thereto of these documents are similarly incorporated by reference for purposes of U.S. patent practice.

Examples of suitable activators capable of ionic cationization of the metallocene compounds of the invention, and consequent stabilization with a resulting non-coordinating anion include:

trialkyl-substituted ammonium salts such as;
    triethylammonium tetraphenylborate,
    tripropylammonium tetraphenylborate,
    tri(n-butyl)ammonium tetraphenylborate,
    trimethylammonium tetrakis(p-tolyl)borate,
    trimethylammonium tetrakis(o-tolyl)borate,
    tributylammonium tetrakis(pentafluorophenyl)borate,
    tripropylammonium tetrakis(o,p-dimethylphenyl) borate,
    tributylammonium tetrakis(m,m-dimethylphenyl) borate,
    tributylammonium tetrakis(p-trifluoromethylphenyl) borate,
    tributylammonium tetrakis(pentafluorophenyl)borate,
    tri(n-butyl)ammonium tetrakis(o-tolyl)borate and the like;

N,N-dialkyl anilinium salts such as;
    N,N-dimethylanilinium tetrakis(pentafluorophenyl) borate,
    N,N-dimethylaniliniumtetrakis(heptafluoronaphthyl) borate,
    N,N-dimethylanilinium tetrakis(perfluoro-4-biphenyl) borate,
    N,N-dimethylanilinium tetraphenylborate,
    N,N-diethylanilinium tetraphenylborate,
    N,N-2,4,6-pentamethylanilinium tetraphenylborate and the like;

dialkyl ammonium salts such as;
    di-(isopropyl)ammonium tetrakis(pentafluorophenyl) borate,
    dicyclohexylammonium tetraphenylborate and the like;

and triaryl phosphonium salts such as;
    triphenylphosphonium tetraphenylborate,
    tri(methylphenyl)phosphonium tetraphenylborate,
    tri(dimethylphenyl)phosphonium tetraphenylborate and the like.

Further examples of suitable anionic precursors include those comprising a stable carbonium ion, and a compatible non-coordinating anion. These include;
    tropillium tetrakis(pentafluorophenyl)borate,
    triphenylmethylium tetrakis(pentafluorophenyl)borate,
    benzene (diazonium) tetrakis(pentafluorophenyl)borate,
    tropillium phenyltris(pentafluorophenyl)borate,
    triphenylmethylium phenyl-(trispentafluorophenyl) borate,
    benzene (diazonium) phenyl-tris(pentafluorophenyl) borate,
    tropillium tetrakis(2,3,5,6-tetrafluorophenyl)borate,
    triphenylmethylium tetrakis(2,3,5,6-tetrafluorophenyl) borate,
    benzene (diazonium) tetrakis(3,4,5-trifluorophenyl) borate,
    tropillium tetrakis(3,4,5-trifluorophenyl)borate,
    benzene (diazonium) tetrakis(3,4,5-trifluorophenyl) borate,
    tropillium tetrakis(3,4,5-trifluorophenyl)aluminate,
    triphenylmethylium tetrakis(3,4,5-trifluorophenyl) aluminate,
    benzene (diazonium) tetrakis(3,4,5-trifluorophenyl) aluminate, tropillinum tetrakis(1,2,2-trifluoroethenyl)borate, triphenylmethylium tetrakis(1,2,2-trifluoroethenyl) borate, benzene (diazonium) tetrakis(1,2,2-trifluoroethenyl) borate, tropillium tetrakis(2,3,4,5-tetrafluorophenyl)borate, triphenylmethylium tetrakis(2,3,4,5-tetrafluorophenyl) borate, benzene (diazonium) tetrakis(2,3,4,5-tetrafluorophenyl) borate, and the like.

Where the metal ligands include halide moieties for example, (methyl-phenyl) silylene(tetra-methyl-cyclopentadienyl)(tert-butyl-amido) zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944, EP-A1-0 570 982 and EP-A1-0 612 768 for processes describing the reaction of alkyl aluminum compounds with dihalide substituted metallocene compounds prior to or with the addition of activating anionic compounds. For example, an aluminum alkyl compound may be mixed with the metallocene prior to its introduction into the reaction vessel. Since the alkyl aluminum is also suitable as a scavenger its use in excess of that normally stoichiometrically required for akylation of the metallocene will permit its addition to the reaction solvent with the metallocene compound. Normally alumoxane would not be added with the metallocene so as to avoid premature activation, but can be added directly to the reaction vessel in the presence of the polymerizable monomers when serving as both scavenger and alkylating activator.

Known alkylalumoxanes are additionally suitable as catalyst activators, particularly for those metallocenes comprising halide ligands. The alumoxane component useful as catalyst activator typically is an oligoireric aluminum compound represented by the general formula $(R—Al—O)_n$, which is a cyclic compound, or $R(R—Al—O)_nAlR_2$, which is a linear compound. In the general alumoxane formula R is a $C_1$ to $C_5$ alkyl radical, for example, methyl, ethyl, propyl, butyl or pentyl and "n" is an integer from 1 to about 50. Most preferably, R is methyl and "n" is at least 4. Alumoxanes can be prepared by various procedures known in the art. For example, an aluminum alkyl may be treated with water dissolved in an inert organic solvent, or it may be contacted with a hydrated salt, such as hydrated copper sulfate suspended in in inert organic solvent, to yield an alumoxane. Generally, however prepared, the reaction of an aluminum alkyl with a limited amount of water yields a mixture of the linear and cyclic species of the alumoxane.

Although trialkyl aluminum is the most preferred scavenger to be used in the invention, other scavengers may be used as set forth below. The term "scavenging compounds" as used in this application and in the claims is meant to include those compounds effective for removing polar impurities from the reaction solvent. Such impurities can be inadvertently introduced with any of the polymerization reaction components, particularly with solvent, monomer and comonomer feed, and adversely affect catalyst activity and stability. It can result in decreasing or even elimination of catalytic activity, particularly when a metallocene cation-non-coordinating anion pair is the catalyst system. The polar impurities, or catalyst poisons include water, oxygen, oxygenated hydrocarbons, metal impurities, etc. Preferably steps are taken before provision of such into the reaction vessel, for example by chemical treatment or careful separation techniques after or during the synthesis or preparation of the various components, but some minor amounts of scavenging compound will still normally be required in the polymerization process itself. Typically, the scavenging compound will be an organometallic compound such as the Group-13 organometallic compounds of 5,153,157, 5,241,025, EP-A-638 and WO-A-91/09882 and WO-A-94/03506, noted above, and that of WO-A-93/14132. Exemplary compounds include triethyl aluminum, triethyl borane, tri-isobutyl aluminum, isobutyl aluminumoxane, those having bulky substituents covalently bound to the metal or metalloid center being preferred to minimize adverse interaction with the active catalyst. When an alumoxane is used as activator, additional scavenging compounds are not necessary. The amount of scavenging agent to be used with metallocene cation-non-coordinating anion pairs is minimized during polymerization reactions to that amount effective to enhance activity.

CHARACTERIZATION OF THE POLYMER DISPERSIONS

The intimate polymer dispersions of this invention contain a semicrystalline plastic (SP) component and an amorphous elastomer (AE) component, but when compared to physical blends having the same proportion of same SP and AE, the intimate polymer dispersions of this invention have improved properties. This invention's polymer dispersions are defined by the difference in the values of these properties from those for a physical mixture of the same polymers, in the same ratio by weight. It is essential that in any comparison of the properties of the intimate polymer dispersions of this invention and a physical mixture of preformed components (hereinafter referred to as "physical blend") the components of the polymer dispersion and the comparative physical mixtures have similar molecular characteristics such as composition, molecular weight and molecular weight distribution so that the two differ only in the procedure used to prepare them. The physical blend is made by blending the two preformed polymers by any technique known in the art such as melt mixing, kneading or coprecipitation from a common solvent. The polymer dispersion of the present invention is made by a solution polymerization, with a metallocene catalyst chosen from the group described above, using multiple polymerization reactors as described in this invention. The component made in the first reactor has less than 0.2 vinyl groups per chain, preferably less than 0.1 vinyl groups per chain, and most preferably, less than 0.05 vinyls per chain. It is critical in the practice of the invention that both of the components of the polymer dispersion are present in the final reactor during the synthesis of the second component.

The polymer dispersions of this invention, after isolation by techniques known in the art, are a mixture of a SP and an AE. This can be distinguished from physical blends by the following characteristics: (a) phase size measured by microscopy (optical, electron beam or atomic force), (b) differences of the solubility of the polymer dispersion compared to the physical blend and, (c) differences in the stress-strain tensile elongation mechanical testing data for the polymers. Additional property improvements for the intimate polymer dispersions as compared to the physical blends which arise from the formation of intimate mixture of the SP/AE components in the polymer dispersion are within the scope of this invention.

Lohse et al. *Macromolecules* 24, 561–566 (1991) show a method of making a polymer with SP and AE components which is similar to this invention. However, in that case, a termonomer was required to provide a vinyl double bond on the polymer made in the first reactor, for the copolymerization of a section of the second polymer, by incorporation of the vinyl double bond. The presence of this vinyl bond can also cause the first polymer to contain undesirable amounts of branching. Also, in this procedure, a different catalyst system was used for each polymer component. For the polymer dispersions of this invention, this restriction on the structure of the polymer made in the first reactor has been removed, only a single catalyst is used, and the beneficial properties are observed in all compositions of the polymer made in the first reactor including polymers without vinyl unsaturation introduced by means of a diene termonomer. Copolymers of ethylene and alpha olefins are examples of AE and homopolymers of ethylene or propylene are examples of SP which contain no vinyl double bonds pendant to the main chain while copolymers of ethylene, alpha olefins and 5-ethylidene-2-norbornene are examples of AE which contain pendant double bonds which are not vinyl.

The reasons for the appearance of these beneficial physical properties of the polymer dispersions of this invention as compared to the corresponding physical blends has not been completely elucidated. While not expecting to be restrained or inhibited by the discussion below we believe that the reason for the beneficial properties observed for the polymer dispersions is the formation of polymeric molecules which have the attributes of both the AE and the SP component. In particular, we believe that such a molecule contains segments of each of the polymeric components. The amount of such molecule may be exceedingly small since the available analytical procedures have not been able to isolate any of the segmented molecules. In the absence of a definite evidence for the formation of such segmented molecules we can speculate that they may be formed by the sequential growth of a single polymeric molecule, partly in the first reactor and partly in the second reactor to form a single molecule which has at least two segments which contain the polymeric characteristic of both the AE and the SP component. An alternate procedure for the formation of such molecules is the availability of a coupling reaction in which the polymer made in the first polymerization reactor reacts with the polymer made in the second polymerization reactor to form a single polymer molecule with segments of both the polymer dispersions and the SP component incorporated therein.

Irrespective of the speculative mechanism, there is strong evidence for the improvement in the mechanical properties of the polymer dispersions of this invention compared to the physical blends. These directions of improvement are shown by the improvement in the properties outlined above. Certain critical properties are diagnostic of the differences between the polymer dispersions and the physical blends. These critical properties are shown in Table 1 below. Table 1 also shows also the direction in the changes in the critical property as the physical blends are replaced by the polymer dispersions.

TABLE 1

Characteristic tests, critical parameters and directional change in parameters on changes in the samples from physical blend to polymer dispersions of the invention.

| Analytical Procedure | Critical Parameter | Direction of change (physical blend vs. polymer dispersion) |
|---|---|---|
| Microscopy of the phase structure | Diameter of the dispersed phase domains | Decreases |
| Differential solubility of the blend | Amount of semicrystalline plastic component eluted with amorphous elastomer | Increases |
| Stress-Strain extension | Elongation and tensile strength | Increases |

When microscopy is carried out on the polymer dispersions of this invention by the method described herein, the ratio of the linear dimension of the dispersed phase to that of the linear dimension of the dispersed phase in a physical mixture of two equivalent polymers, this ratio being defined by the factor A, will be less than 1, preferably less than 0.6, and most preferably less than 0.4. In addition, the average diameter of the disperse phase of the polymer dispersion will be less than 0.7 $\mu$m, preferably less than 0.55 $\mu$m, and most preferably less than 0.4 $\mu$m.

The elongation at break, measured by the technique described herein, is significantly higher for the polymer dispersions of this invention than for a comparative physical mixture of two equivalent SP/AE. The ratio of the elongation at break for a given polymer dispersion to the comparative physical blend, this ratio being defined by the factor B, will be greater than 2, preferably greater than 3, and most preferably greater than 4.

REPRESENTATIVE EXAMPLES

Polymerizations were carried out in two, one liter stirred reactors in series with continuous flow of feeds to the system and continuous withdrawal of products. The first reactor could also be operated as a single reactor. Solvent, including but not limited to hexane, and monomers including but not limited to, ethylene, propylene, and ENB (5-ethylidene-2-norbornene) were purified over beds of alumina and molecular sieves. Toluene for preparing catalyst solutions was also purified by the same technique. All feeds were pumped into the reactors by metering pumps except for the ethylene which flowed as a gas under its own pressure through a mass flow meter/controller. Reactor temperature was controlled by circulating water through a reactor cooling jacket. The reactors were maintained at a pressure in excess of the vapor pressure of the reactant mixture to keep the reactants in the liquid phase. The reactors were operated liquid full.

Ethylene and propylene feeds were combined into one stream and then mixed with a pre-chilled hexane stream that had been cooled to at least 0° C. If ENB was used, it was also fed into the hexane stream upstream of the other monomers. A hexane solution of triisobutyl aluminum scavenger was added to the combined solvent and monomer stream just before it entered the reactor to further reduce the concentration of any catalyst poisons. A mixture of the catalyst components in toluene was pumped separately to the reactor and entered through a separate port. The solution of polymer, solvent, unconverted monomers, and catalyst exiting the first reactor entered the second reactor. An additional hexane solution of the monomers was fed into the second reactor through a separate port.

The product from the second reactor exited through a pressure control valve that reduced the pressure to atmospheric. This caused the unconverted monomers in the solution to flash into a vapor phase which was vented from the top of a vapor liquid separator. The liquid phase, comprising mainly polymer and solvent, flowed out the bottom of the separator and was collected for polymer recovery. Polymer was recovered from solution by either steam stripping following by drying, or by solvent evaporation under heat and vacuum.

The polymer from the first and second reactors was characterized by Mooney viscosity (by Mooney Viscometer, ASTM D1648), ethylene content (by FTIR, ASTM D3900), ENB content (by FTIR, ASTM D6047), melt temperature and/or glass transition temperature (by DSC, described herein), and molecular weight (by GPC, described herein). Analysis of the second reactor polymer represents the properties of the overall polymer blend.

Gel Permeation Chromatography (GPC) techniques that were used to characterize the products of this invention have been described in several publications notably U.S. Pat. No. 4,989,436 which is incorporated for purposes of U.S. patent practice. Molecular weight and composition measurements are described in G. Ver Strate, C. Cozewith, S. Ju, *Macromolecules*, 21, 3360 (1988) which is incorporated by reference for purposes of U.S. patent practice. The variety of other techniques used are soundly based in polymer structure characterization as described in "Structure Characterization" *The Science and Technology of Elastomers*, F. Eirich, editor, Academic Press 1978, Chapter 3 by G. Ver Strate. Differential scanning calorimetry (DSC) was used to characterize the products of this invention has a standard protocol of loading a calorimeter at 20° C. with a specimen free of molding strains, cooling the sample to −75° C., scanning to 180° C. at 10° C./min., cooling to −75° C., and re-running the scan. The $T_g$, $T_m$ and heat of fusion are evaluated. In some cases, low melting crystallinity will not be seen on the second scan as it may take many hours to develop even at low temperatures.

Samples of the polymer solution from the first and second reactors were analyzed for polymer concentration. From this measurement and the reactor feed rates, the polymerization rates in both reactors could be determined by material balances. Monomer conversions were then calculated from the polymerization rate and polymer composition data for the first reactor alone and for the total of both reactors together. In order to calculate the polymerization rite and polymer composition in the second reactor alone, the following material balance equations were used:

$$PR_2 = PR_t - PR_1 \qquad \text{Eq. 1}$$

$$F_1 = PR_1/PR_t \qquad \text{Eq. 2}$$

$$E_2 = \{E_t - (F_1 \times E_1)\}/(F_1 - 1) \qquad \text{Eq. 3}$$

$$D_2 = \{D_t - (F_1 \times D_1)\}/(F_1 - 1) \qquad \text{Eq. 4}$$

$$MN_2 = (1 - F_1)/(1/MN_t - F_1/MN_1) \qquad \text{Eq. 5}$$

$$MW_2 = (MW_t - F_1 * MW_1)/(1 - F_1) \qquad \text{Eq. 6}$$

where:
$PR_1$=1st reactor polymerization rate
$PR_2$=2nd reactor polymerization rate
$PR_t$=Total polymerization rate
$E_1$=Ethylene content of 1st reactor polymer
$E_2$=Ethylene content of 2nd reactor polymer
$E_t$=Ethylene content of total reactor polymer
$D_1$=Diene content of 1st reactor polymer
$D_2$=Diene content of 2nd reactor polymer
$D_t$=Diene content of total reactor polymer
$F_1$=Fraction of total polymer made in first reactor
$MN_1$=Number average MW of 1st reactor polymer
$MN_2$=Number average MW of 2nd reactor polymer
$MN_t$=Number average MW of total reactor polymer
$MW_1$=Weight average MW of 1st reactor polymer
$MW_2$=Weight average MW of 2nd reactor polymer
$MW_t$=Weight average MW of total reactor polymer A series of polymerizations was carried out to demonstrate the process and products of this invention. These are shown in the examples below. The synthesis data for the polymers representative of the invention are collected in Table 2 below and the characterization data for the polymers of these examples are collected in Table 3 below.

Example 1 (HTCPU: run 123A)

A catalyst solution was prepared by dissolving $\mu$-Me$_2$Si(Indenyl)$_2$HfMe$_2$ catalyst and DMAH (N,N dimethylaniliniumtretakis(pentafluorophenyl)borate [DMAH$^+$B$^-$(pfp)$_4$]) activator in dry toluene and fed to the first reactor along with ethylene, propylene, and hexane. TIBA (triisobutylaluminum) was fed to the first reactor in hexane solution to serve as a poison scavenger. The polymer solution exiting the first reactor entered the second reactor. Additional ethylene and hexane were fed to the second reactor. Reactor flows are shown in Table 2. i-Propanol was added to the polymer solution leaving the second reactor to quench the polymerization. This solution was added to boiling water to flash off the solvent and precipitate the polymer as a wet mass which was then dried in a vacuum oven. The ethylene/propylene feed ratio to the first reactor was 0.0475 wt/wt to produce a copolymer with a high propylene content. The monomer feed to the second reactor consists of the unreacted monomers entering from the first reactor plus the additional monomer feed added to the second reactor. Only additional ethylene was fed to the second reactor in this example to produce a polymer with a high ethylene content. Based on material balance calculations for the amount of unreacted propylene leaving the first reactor and entering the second reactor, the ratio of ethylene to propylene entering the second reactor feed was 0.667. The ethylene content was measured to be 17 wt % for the first reactor polymer and 45.9% for total polymer exiting the second. The polymerization rates were 72.3 g/hr in the first reactor and 171.3 in the second. thus 70.3% of the total polymer was made in the second reactor. Based on these rates, the ethylene content of the polymer made in the second reactor was 58.1%.

Example 2 (HTCPU run 127A, B, C)

Polymerization was carried out in a similar fashion to example 1; however, the ethylene feed rate to the second reactor was increased in a stepwise manner from 90 to 150 and then 180 g/hr to raise the amount and the ethylene content of the polymer made in the second reactor (see data in Table 2 for examples 2A, 2B, and 2C). After each change in ethylene feed rate, the reactor was allowed sufficient time to reach steady state before samples were taken for analysis.

The ethylene content of the polymer made in the first reactor was 16.1, 17.6, and 16.5 wt % in the three experiments (runs 2A, 2B, and 2C). The polymer made in the second reactor was calculated to contain 47.4, 60 and 61% ethylene as the ethylene feed rate increased. The amount of polymer produced in the second reactor was 63.8, 70.4 and 80.5 wt % of the total in experiments 2A, 2B and 2C.

Example 3 (HTCPU run 163A and B)

This polymerization was similar to example 1 except that the monomer feed ratio of ethylene to propylene to the first reactor was adjusted to reduce the ethylene content of the polymer made in the first reactor and produce a polymer with increased levels of propylene crystallinity. Two polymerizations were carried out (experiments 3A and 3B in Table 2). Example 3B was made with a higher propylene feed rate to the second reactor than in Example 3A and also less propylene was fed to the second reactor to maintain a high ethylene content in the second reactor polymer.

In example 3A, the polymer made in the first and second reactor contained 5.9 wt % and 58.2 wt % ethylene respectively. Fifty three wt % of the polymer was made in the second reactor. At the conditions of 3B, the polymers made in the first and second reactors contained 4.3 wt % and 63.4 wt % ethylene and the second reactor produced 46.6 wt % of the total polymer.

Example 4 (HTCPUT run 302A, B, C)

Polymers were made according to the above procedures according to the recipe shown in the Table 2 below to form the polymer shown in Table 3 below.

Example 5 (HTCPU run 307A, B, C and D)

Polymers were made according to the above procedures according to the recipe shown in Table 2 below to form the polymer shown in Table 3 below.

Example 6 (HTCPU run 318A, B, C and D)

Polymers were made according to the above procedures according to the recipe shown in Table 2 below to form the polymer shown in Table 3 below.

TABLE 2

Data for the synthesis of the polymer dispersions of the invention

| Exp. # | Reactor | Hexane cc/min | Ethylene g/hr | Propylene g/hr | Diene g/hr | Reactor T ° C. | Catalyst g/hr | Poly rate g/hr |
|---|---|---|---|---|---|---|---|---|
| 1 | R1 | 52 | 11 | 240 | 0 | 20 | 0.004 | 87 |
|  | R2 | 20 | 120 | 0 | 0 | 40 |  | 170 |
|  | Total | 72 | 131 | 240 | 0 |  |  | 257 |
| 2A | R1 | 52 | 10 | 242 | 0 | 20 | 0.004 | 76 |
|  | R2 | 20 | 90 | 0 | 0 | 40 |  | 134 |
|  | Total | 72 | 100 | 242 | 0 |  |  | 210 |
| 2B | R1 | 52 | 10 | 242 | 0 | 20 | 0.004 | 78 |
|  | R2 | 20 | 150 | 0 | 0 | 40 |  | 185 |
|  | Total | 72 | 160 | 242 | 0 |  |  | 263 |
| 2C | R1 | 52 | 10 | 242 | 0 | 20 | 0.004 | 58 |
|  | R2 | 20 | 180 | 0 | 0 | 53 |  | 242 |
|  | Total | 72 | 190 | 242 | 0 |  |  | 300 |
| 3A | R1 | 52 | 10 | 240 | 0 | 41 | 0.004 | 142 |
|  | R2 | 20 | 120 | 106 | 0 | 75 |  | 160 |
|  | Total | 72 | 130 | 346 | 0 |  |  | 303 |
| 3B | R1 | 52 | 10 | 295 | 0 | 41 | 0.004 | 198 |
|  | R2 | 20 | 120 | 73 | 0 | 75 |  | 168 |
|  | Total | 72 | 130 | 368 | 0 |  |  | 366 |
| 4A | R1 | 92 | 0 | 360 | 0 | 60 | 0.0083 | 165 |
|  | R2 | 36 | 180 | 30 | 24.6 | 80 |  | 191 |
|  | Total | 128 | 180 | 390 | 24.6 |  |  | 356 |
| 4B | R1 | 92 | 15 | 360 | 0 | 60 | 0.0083 | 222 |
|  | R2 | 36 | 180 | 30 | 24.6 | 80 |  | 168 |
|  | Total | 128 | 180 | 390 | 24.6 |  |  | 390 |
| 4C | R1 | 92 | 15 | 360 | 0 | 40 | 0.0083 | 213 |
|  | R2 | 36 | 180 | 30 | 24.6 | 80 |  | 194 |
|  | Total | 128 | 180 | 390 | 24.6 |  |  | 407 |
| 5A | R1 | 92 | 0 | 360 | 0 | 60 | 0.00835 | 165 |
|  | R2 | 0 | 234 | 42 | 17.2 | 80 |  | 239 |
|  | Total | 92 | 234 | 402 | 17.2 |  |  | 404 |
| 5B | R1 | 92 | 15 | 360 | 0 | 60 | 0.00835 | 206 |
|  | R2 | 36 | 234 | 42 | 17.2 | 80 |  | 231 |
|  | Total | 128 | 249 | 402 | 17.2 |  |  | 437 |
| 5C | R1 | 92 | 15 | 360 | 0 | 60 | 0.00835 | 206 |
|  | R2 | 36 | 234 | 42 | 12.9 | 80 |  | 253 |
|  | Total | 128 | 249 | 402 | 12.9 |  |  | 459 |
| 5D | R1 | 92 | 15 | 360 | 0 | 60 | 0.00835 | 208 |
|  | R2 | 36 | 234 | 42 | 22.4 | 80 |  | 216 |
|  | Total | 128 | 249 | 402 | 22.4 |  |  | 424 |
| 6A | R1 | 92 | 132 | 104 | 0 | 61 | 0.0057 | 177 |
|  | R2 | 0 | 0 | 308 | 0 | 75 |  | 23 |
|  | Total | 92 | 132 | 412 | 0 |  |  | 200 |
| 6B | R1 | 92 | 132 | 104 | 0 | 61 | 0.0057 | 177 |
|  | R2 | 35 | 0 | 389 | 0 | 75 |  | 94 |
|  | Total | 127 | 132 | 493 | 0 |  |  | 271 |

TABLE 2-continued

Data for the synthesis of the polymer dispersions of the invention

| Exp. # | Reactor | Hexane cc/min | Ethylene g/hr | Propylene g/hr | Diene g/hr | Reactor T °C. | Catalyst g/hr | Poly rate g/hr |
|---|---|---|---|---|---|---|---|---|
| 6C | R1 | 92 | 132 | 104 | 0 | 62 | 0.0057 | 178 |
|  | R2 | 35 | 0 | 486 | 0 | 75 |  | 92 |
|  | Total | 127 | 132 | 590 | 0 |  |  | 270 |
| 6D | R1 | 92 | 132 | 104 | 0 | 62 | 0.0057 | 178 |
|  | R2 | 35 | 30 | 388 | 0 | 75 |  | 135 |
|  | Total | 127 | 162 | 492 | 0 |  |  | 313 |

TABLE 3

Data for the characterization of the polymer dispersions of the invention

| Exp. # | Reactor | Ethylene wt % | Diene wt % | ML @ 125 (1 + 4) | Mn × 1000 | MWD |
|---|---|---|---|---|---|---|
| 1 | R1 | 17 | 0 |  |  |  |
|  | R2 | 56.9 | 0 |  |  |  |
|  | Total | 43.4 | 0 | 46.4 | 95.2 |  |
| 2A | R1 | 16.1 | 0 |  |  |  |
|  | R2 | 47.4 | 0 |  |  |  |
|  | Total | 36.1 | 0 | 39.2 | 104 |  |
| 2B | R1 | 17.6 | 0 |  |  |  |
|  | R2 | 60 | 0 |  |  |  |
|  | Total | 47.4 | 0 | 69.7 | 89.4 |  |
| 2C | R1 | 16.5 | 0 |  |  |  |
|  | R2 | 61 | 0 |  |  |  |
|  | Total | 52.3 | 0 | 75.2 | 87.9 |  |
| 3A | R1 | 5.9 | 0 |  |  |  |
|  | R2 | 58.2 | 0 |  |  |  |
|  | Total | 33.6 | 0 | 18.2 | 78.4 |  |
| 3B | R1 | 4.3 | 0 |  |  |  |
|  | R2 | 63.4 | 0 |  |  |  |
|  | Total | 31.4 | 0 | 30.3 | 84.3 |  |
| 4A | R1 |  | 0 |  |  |  |
|  | R2 |  | 5.74 |  |  |  |
|  | Total |  | 3.08 | 193 | 78.1 |  |
| 4B | R1 |  | 0 |  |  |  |
|  | R2 |  | 8.4 |  |  |  |
|  | Total |  | 3.62 | 4.2 | 63.6 |  |
| 4C | R1 |  | 0 |  |  |  |
|  | R2 |  | 7.16 |  |  |  |
|  | Total |  | 3.42 | 18 | 94.6 |  |
| 5A | R1 |  | 0 |  |  |  |
|  | R2 |  | 4.57 |  |  |  |
|  | Total |  | 2.70 | 130 | n/a |  |
| 5B | R1 |  | 0 |  |  |  |
|  | R2 |  | 4.33 |  |  |  |
|  | Total |  | 2.29 | 9.3 | n/a |  |
| 5C | R1 |  | 0 |  |  |  |
|  | R2 |  | 4.05 |  |  |  |
|  | Total |  | 2.23 | 9.4 | n/a |  |
| 5D | R1 |  | 0 |  |  |  |
|  | R2 |  | 3.05 |  |  |  |
|  | Total |  | 1.55 | 5.8 | n/a |  |
| 6A | R1 |  | 0 |  |  |  |
|  | R2 |  | 0 |  |  |  |
|  | Total |  | 0 | 13.8 | 70.8 |  |
| 6B | R1 |  | 0 |  |  |  |
|  | R2 |  | 0 |  |  |  |
|  | Total |  | 0 | 11.4 | 61.1 |  |
| 6C | R1 |  | 0 |  |  |  |
|  | R2 |  | 0 |  |  |  |
|  | Total |  | 0 | 15.2 | 61.1 |  |
| 6D | R1 |  | 0 |  |  |  |
|  | R2 |  | 0 |  |  |  |
|  | Total |  | 0 | 7.7 | 67 |  |

Using these synthetic procedures we show representative examples of the synthesis of polymer dispersions in Table 4. Table 4 shows examples of the SP component being either Polyethylene, Ethylene Propylene copolymer (EP in Table 4) or Polypropylene. These SP components have either polyethylene or isotactic polypropylene crystallinity while the polymer dispersions is always an ethylene propylene copolymer. The composition of the ethylene-propylene copolymer is specified in terms of the ethylene (E in Table 4) content by weight and the 5-Ethylidene-2-Norbomene (ENB in Table 4) content by weight. Table 3 also shows the flexibility of the synthesis process since the SP component may be made either in the lead reactor (R1 in Table 4) or the trailing reactor (R2 in Table 4) in the train of polymerization reactors.

TABLE 4

Composition and reactor sequence design for the synthesis of polymer dispersions.

| Semicrystalline plastic (SP) component | | | Amorphous elastomer (AE) | | |
|---|---|---|---|---|---|
| Composition | Crystallinity | Reactor | Composition | Reactor | Example |
| EP with 58% E | Polyethylene | R2 | EP with 17% E | R1 | 1 |
| EP with 63% E | Polyethylene | R2 | EP with 16.1% E | R1 | 2A |
| EP with 70.4% E | Polyethylene | R2 | EP with 17.6% E | R1 | 2B |
| EP with 80.5% E | Polyethylene | R2 | EP with 16.5% E | R1 | 2C |
| EP with 5.9% E | isotactic PP | R1 | EP with 58.2% E | R2 | 3A |
| EP with 4.3% E | isotactic PP | R1 | EP with 63.4% E | R2 | 3B |
| Poly-propylene | isotactic PP | R1 | EPDM with 25.5% E, 5.7% ENB | R2 | 4A |
| EP with 9.8% E | isotactic PP | R1 | EPDM with 55.0% E, 8.4% ENB | R2 | 4B |
| EP with 10.6% E | isotactic PP | R1 | EPDM with 61.5% E, 7.16% ENB | R2 | 4C |
| Poly-propylene | isotactic PP | R1 | EPDM with 78.7% E, 4.57% ENB | R2 | 5A |
| EP with 10.4% E | isotactic PP | R1 | EPDM with 55.6% E, 4.33% ENB | R2 | 5B |
| EP with 10.4% E | isotactic PP | R1 | EPDM with 58.3% E, 4.05% ENB | R2 | 5C |
| EP with 10.4% E | isotactic PP | R1 | EPDM with 51.3% E, 3.05% ENB | R2 | 5D |
| EP with 5.19% E | isotactic PP |  | EP with 69.9% E | R1 | 6A |
| EP with 11% E | isotactic PP |  | EP with 68.7% E | R1 | 6B |
| EP with | isotactic PP |  | EP with |  R1 | 6C |

TABLE 4-continued

Composition and reactor sequence design for the synthesis of polymer dispersions.

| Semicrystalline plastic (SP) component | | | Amorphous elastomer (AE) | | |
|---|---|---|---|---|---|
| Composition | Crystallinity | Reactor | Composition | Reactor | Example |
| 5.32% E EP with 14% E | isotactic PP | | 68.7% E EP with 69.4% E | R1 | 6D |

Example 7

In this example, we demonstrate the absence of vinyl groups greater than 0.2/chain in the ethylene copolymers made under representative polymerization conditions used in the lead reactor of the train of reactors for the practice of this invention. The data for the polymerization is shown in Table 5) for a variety of ethylene contents of the polymers made under a range of polymerization temperatures. The concentration of unsaturation in the polymer was obtained by $^{13}C$ NMR analysis while the number average Mw was obtained by GPC. The data shows that under a variety of reaction conditions, the mole fraction of vinyl groups per chain is less than 0.2.

tion catalysts or the metallocene catalysts specified above which are known to have a single polymerization site. This ensures that the physical blend has the same component characteristics as the polymer dispersion. We found the properties of the physical blend to be only weakly dependent on the composition of the components. The guideline we used in the selection of the components for the physical blend was that the composition of each of the components was within a relative 10% of the ethylene content of the component of the polymer dispersion we intended to replicate. Thus, a polymer dispersion as in representative example 2C, could be duplicated by mixing the components with an ethylene content of 80.5+/−8% ethylene for the SP component and the ethylene propylene copolymer with 16.5+/−1.6 wt % ethylene for the polymer dispersions. The effect of the molecular weight on the components of the blends was less pronounced. While the molecular weight of the components is very effective in changing properties at molecular weights less than 5000, within the molecular weight ranges of the current invention there were substantially no differences if the molecular weight of the similar components in the polymer dispersion and the physical blend were different by 25%. Thus, the properties of a polymer dispersions in an polymer dispersion with a molecular weight of 80,000 could be compared with a polymer dispersions of the composition limitations above in

TABLE 5

| | | Unsaturation per 1000 carbon atoms | | | | | Unsaturation Fraction | | | | Mol. Weight $Mn \times 10^{-3}$ | mol frac C2 | ave MW | Mol frac vinyl |
|---|---|---|---|---|---|---|---|---|---|---|---|---|---|---|
| | % C2 = | temp | vinylenes | trisubst. | vinyls | vinylidene | total unsat. | vinylenes | trisubst. | vinyls | vinylidene | | | |
| 7a | 12.7 | 40 | 0.01 | 0 | 0 | 0.13 | 0.14 | .0714 | .0000 | .0000 | .9286 | 96 | 0.18 | 39.49 | 0.00 |
| 7b | 15 | 40 | 0 | 0 | 0 | 0.15 | 0.15 | .0000 | .0000 | .0000 | 1.0000 | 105 | 0.21 | 39.07 | 0.00 |
| 7c | 38.4 | 40 | 0.01 | 0 | 0 | 0.18 | 0.19 | .0526 | .0000 | .0000 | .9474 | 92.7 | 0.48 | 35.23 | 0.00 |
| 7d | 38.3 | 40 | 0.03 | 0.01 | 0 | 0.2 | 0.24 | .1250 | .0417 | .0000 | .8333 | 94.6 | 0.48 | 35.25 | 0.00 |
| 7e | 57.7 | 40 | 0.02 | 0.03 | 0 | 0.22 | 0.27 | .0741 | .1111 | .0000 | .8148 | 47.4 | 0.67 | 32.60 | 0.00 |
| 7f | 61.7 | 40 | 0.01 | 0 | 0 | 0.13 | 0.14 | .0714 | .0000 | .0000 | .9286 | | 0.00 | 42.00 | 0.00 |
| 7g | 62.4 | 102 | 0.02 | 0.04 | 0.01 | 0.38 | 0.45 | .0444 | .0889 | .0222 | .8444 | 41.1 | 0.71 | 32.01 | 0.03 |
| 7h | 24.1 | 40 | 0.01 | 0 | 0.02 | 0.16 | 0.19 | .0526 | .0000 | .1053 | .8421 | 58.5 | 0.32 | 37.48 | 0.16 |
| 7i | 59.2 | 70 | 0.01 | 0 | 0.02 | 0.22 | 0.25 | .0400 | .0000 | .0800 | .8800 | 38.6 | 0.69 | 32.41 | 0.10 |
| 7j | 54.2 | 70 | 0 | 0 | 0.02 | 0.19 | 0.21 | .0000 | .0000 | .0952 | .9048 | 49.5 | 0.64 | 33.04 | 0.14 |
| 7k | 44.5 | 70 | 0 | 0 | 0.03 | 0.19 | 0.22 | .0000 | .0000 | .1364 | .8636 | 46.9 | 0.55 | 34.36 | 0.19 |
| 7l | 28.4 | 71 | 0.04 | 0.05 | 0.04 | 0.33 | 0.46 | .0870 | .1087 | .0870 | .7174 | 37.3 | 0.37 | 36.78 | 0.09 |
| 7m | 18 | 71 | 0.03 | 0.03 | 0.03 | 0.21 | 0.3 | .1000 | .1000 | .1000 | .7000 | 52.4 | 0.25 | 38.53 | 0.14 |
| 7n | 12.2 | 71 | 0.02 | 0.02 | 0.04 | 0.2 | 0.28 | .0714 | .0714 | .1429 | .7143 | 49.1 | 0.17 | 39.59 | 0.18 |
| 7o | 6.4 | 71 | 0.04 | 0.04 | 0.04 | 0.19 | 0.31 | .1290 | .1290 | .1290 | .6129 | 49.1 | 0.09 | 40.70 | 0.16 |

Comparative Non Inventive Examples

The comparative, non inventive examples to distinguish the novelty of the current invention were made by the physical melt mixing of a polymer dispersion and a SP component in the same weight proportion as in the polymer dispersions. It was important that the weight proportion of the polymer dispersions and the comparative physical blends be similar to within 5% for a true comparison of the relative properties. It was also important that the polymers for the physical blend be approximate replicas of the components of the polymer dispersion. Thus, the physical blends were made with polymers made from single sited polymerization catalysts such as a chosen group of vanadium polymerizaa physical blend with a molecular weight of 60,000 to 100,000.

The comparative physical blends were made by blending preformed polymers of the similar composition and molecular weight, as in the polymer dispersions, in a 300 cc Brabender mixer at 170° C. to 200° C. for 5 minutes at 85 rpm. This mixer is available from C. W. Brabender Instruments, Inc., South Hackensack, N.J. The mixer was fitted with a high shear roller blades which in our experience lead to uniform dispersion within the mixing time. The physical blends were removed from the mixer after mixing, then fabricated and tested identically to the polymer dispersions. The physical blends used in this study are shown in the Table 6 below. The composition of the ethylene-propylene copolymer is specified in terms of the ethylene (E in Table 6) content by weight and the 5-Ethylidene-2-Norbornene (ENB in Table 6) content by weight.

TABLE 6

Composition and weight ratios of components for the synthesis of physical blends

| Semicrystalline plastic (SP) component | | | Amorphous elastomer (AE) | | | Reference/ |
|---|---|---|---|---|---|---|
| Composition | Crystallinity | Wt % | Composition | Wt % | Example | Example |
| EP with 83% E | Polyethylene | 20 | EP with 18.3% E | 80 | 7 | 2C |
| EP with 4.1% E | isotactic PP | 52 | EP with 60.1% E | 48 | 8 | 3B |
| Polypropylene | isotactic PP | 42 | EPDM with 27.4% E, 4.9% ENB | 58 | 9 | 4A |
| Polypropylene | isotactic PP | 40 | EPDM with 75% E, 4.2% ENB | 60 | 10 | 5A |
| EP with 5.02% E | isotactic PP | 33 | EP with 73.2% E | 67 | 11 | 6A |

Microscopy of the Phase Structure

The morphology of the blends was examined using transmission electron microscopy (TEM). Compression molded samples of approximately 0.12 inch thickness of the polymer dispersions and physical blends which had been held in quiescent state for 30–40 minutes at 200° C. were cryogenically (−196° C.) microtomed to sections 50–100 μm thick with a Reichert-Jung FC-4 ultramicrotome. These thin sections were stained in the vapor phase above a 1% aqueous solution of $RuO_4$ for several days. The metal oxide preferentially attacked the AE component of the polymer dispersion or the physical blend while the SP component was relatively unaffected. The TEM micrographs of the polymer blend showed darker images for the location of the AE component and lighter images for the SP component.

TEM pictures obtained by the procedure above were scanned at a resolution of 300 dpi on a Hewlett-Packard scanner to create a dot matrix file. The file was analyzed using Image 1.47, a software developed by Wayne Rasband (NIH) on a Apple Macintosh Quadra 650. The program differentiates between the images of the dispersed phase and the surrounding matrix according to the contrast between the phases. Image analysis of the SEM micrographs having a high contrast between the dispersed and continuous phases was used to generate the critical data for the size of the domains of the dispersed phase. Supplementary data for the area of the size of the dispersed phase was also generated according to this procedure as an internal validation of the procedure. Data for the area and diameter of the dispersed phase particles is generated by this analysis. Statistical analysis of the data is performed using Microsoft Corporation Excel 5 data analysis and spreadsheet software. Typically, approximately 200 particles from 5 to 6 micrographs were analyzed to obtain statistically significant results.

The cross section for the TEM micrographs show images for the dispersed phase which are nearly circular. This indicates that the effect of prior mechanical shear which would lead to the preferential distortion of the dispersed phase in the direction of the deformation has been completely eradicated by the quiescent thermal treatment. It is expected that under these conditions the phase dimensions of the dispersed phase would have reached near equilibrium conditions. This phenomenon has been observed and documented by Datta, et al in *Macromolecules* 26, 2064–2076 (1993). Typically, the differences in the smallest and the largest diameters of any one particle differed by less than 25%. Under these conditions the area of the particle in the cross section of the sample is approximated as the area of the circle with the diameter indicated above. A measure of the accuracy of the image analysis is the ratio of the sum of the area of the dispersed phase for all the images as a fraction of the total area of the images. Ideally, this should be the same as the volume fraction of the dispersed phase in the polymer dispersion. Choice of the contrast and imaging criteria in the software can affect this ratio and we have chosen the contrast criteria for the image analysis pictures to preserve this ratio to within 7% of the value expected from the ratio of blend components from the polymerization experiments.

The distinguishing novelty for the invention is shown in the data for the size of the dispersed phase of the particles. The data is shown for the arithmetic average of the particle size for all of the micrographs of the blends. Each polymer dispersion as well as the comparative blends are shown in the data Table 7. Comparative blends are made as described above. The data for the average size of the dispersed phase shows that the polymer dispersions of the present invention leads to smaller size of the dispersed phase compared to physical blends of the comparative examples.

Factor A is defined as the ratio of the linear dimensions of the dispersed phase of the polymer dispersions of the current invention to the average linear dimension of the dispersed phase of the corresponding physical blend. In the current case the linear dimensions are the diameter of the dispersed phase. It is possible to have polymer dispersions of the current invention where the dispersed phase is not approximately circular in cross-section in electron micrographs. In these cases, A is the ratio of the statistical average of an average characteristic size such as the random chord length of the dispersed phase in the polymer dispersion to the random chord length size of the dispersed phase in the physical blend. Values of A for the inventive blends and physically mixed blends of the equivalent polymer are shown in Table 7. A is significantly less for the inventive blends.

TABLE 7

Average mean diameters of the dispersed phases in polymer dispersions and the corresponding physical blends and values of the critical ratio A

| Example | Average diameter of the dispersed phase (μm) | Comparative example | Average diameter of the dispersed phase (μm) | Critical factor A |
|---|---|---|---|---|
| 2C | 0.23 | 7 | 1.1 | .21 |
| 3B | 0.32 | 8 | 0.95 | .33 |
| 4A | 0.52 | 9 | 0.76 | .68 |
| 4B | 0.45 | na | na | |
| 6A | 0.39 | 11 | 0.68 | .57 |

Differential Solvent Fractionation:

Fractionation of the polymer with a solvent using the criteria of the partial solubility of the polymer, was used to determine the presence of the polymeric portions, being either the amorphous elastomer or the SP component which had the solubility properties changed as a result of the synthesis procedure resulting in the formation of the intimate dispersion. This solvent fractionation procedure has been described most completely in the publication in the journal *Macromolecules* by Stejskal, et al., 1989, v. 22 pp. 861. This article also describes the analysis of the formation of polymeric portions of intermediate solubility in polymeric mixtures of intimate dispersion. While not being constrained by the explanation we believe that the results of the solvent fractionation of the polymer dispersions and the physical blends demonstrate differences in the molecular architecture of the polymer dispersion polymers which have the same composition and blend components as the physical blends but differ in their properties as described in the invention. In this procedure, a sample of the polymer blend, being either the physical blend or the polymer dispersion of the invention was analyzed.

Approximately 3.0 g of polymer was accurately weighed out and pressed out into a thin film onto a square of 400 mesh stainless steel with approximately 4"–5" sides. The stainless steel mesh was immersed in approximately 400–500 ml of cyclohexane maintained at room temperature (69° F. to 73° F.) in a glass container with a close fitting cap. 1 ml of a solution of Irganox-1076, an antioxidant available commercially from Ciba-Geigy Corporation (now Novartis Corporation) was added to the glass container prior to the addition of the cyclohexane. The solution of the antioxidant contained 26 g of Irganox-1076 per 10 L of hexane.

The sample of the blend was immersed in the solvent for 48 hours. During this period the soluble portion of the sample was extracted into the cyclohexane solvent while the insoluble portion of the sample was retained on the mesh. At the end of that period the mesh contained the insoluble portion of the sample was removed while the solution of the soluble portion of the polymer was removed and evaporated to leave a solid residue of the portion of the polymer blend soluble in cyclohexane. In general, for both the polymer dispersion as well as the physical blend, the insoluble portion consists largely of the SP component and the soluble portion consists of the polymer dispersions.

However, for the polymers of this invention, the weight fraction and/or the composition of the soluble polymers differs from that of the physical blend of the equivalent polymers. Essentially complete separation of the physical blends into the SP component and the polymer dispersions results from this separation technique. Gravimetric analysis of the fractions indicate that the relative weights of the fractions are similar to the corresponding weights of the two polymers used to make the physical blend. IR analysis of the fractions confirms the identity of the fractions to be similar to the composition of the individual polymers used for the formation of the physical blend. DSC analysis of the soluble fraction from the separation indicates little or no extraction of the SP component into the soluble fraction. These results are summarized in Table 8. Table 8 is in two parts. Table 8a summarizes the results for the polymer dispersions of this invention. Table 8b summarizes the results for the physical blends of the comparative examples. These analytical results in Table 8b are expected on the basis of the simple physical mixture of polymers used to synthesize these blends.

The results are substantially different for the *in situ*, intimately dispersed blends, and are a distinguishing novelty of the invention. Extraction of the polymer dispersions of the present invention lead to fractions of polymers which do not correspond to either the weight fraction or the composition of the expected pure polymer dispersions or the SP component. The weight fraction of the soluble fraction is generally less than the weight fraction of the AE in the polymer dispersion made in the appropriate polymerization reactor. Further, the composition of both the soluble and insoluble fraction are substantially different than the individual components of the polymer dispersion. These differences can be attributed to the extraction of the SP component in the soluble fraction which contains the polymer dispersions as well as the retention of some portion of the polymer dispersions within the insoluble SP component. The data shown in Table 8 illustrates this feature of the invention. The extraction of a portion of the SP component with the polymer dispersions is confirmed by the DSC analysis of this fraction which shows that appearance of a melting peak consistent with the presence of a minor amount of the SP component.

TABLE 8(a)

Differential solvent fractionation of polymer dispersions. (% E = Composition of the polymer in % ethylene, AE = amorphous elastomer, SP = Semicrystalline plastic component)

| Experiment | Soluble fraction | | Insoluble fraction | | Polymerization: SAE | | Polymerization: SPC | |
|---|---|---|---|---|---|---|---|---|
| | Wt fraction | % E | Wt fraction | % E | Wt fraction | % E | Wt fraction | % E |
| 1  | 86 | 45.9 | 14 | na | 67 | 59.6 | 33 | 17 |
| 2A | 63 | 34.7 | 37 | na | 64 | 36.1 | 36 | 16 |
| 2B | 68 | 36.8 | 32 | na | 70 | 47.4 | 30 | 17.6 |
| 2C | 78 | 50.1 | 22 | na | 80 | 52   | 20 | 16 |
| 4B | 80 |      | 20 |    | 43 |      | 57 |    |
| 4C | 66 |      | 34 |    | 48 |      | 52 |    |
| 5B | 65 |      | 34 |    | 53 |      | 47 |    |
| 5C | 71 |      | 29 |    | 55 |      | 45 |    |
| 5D | 59 |      | 41 |    | 51 |      | 49 |    |

TABLE 8(b)

Differential solvent fractionation of physical blends. (% E = Composition of the polymer in ethylene, AE = amorphous elastomer, SP = Semicrystalline plastic component)

| Experiment | Soluble fraction | | Insoluble fraction | | Mixing: AE | | Mixing: SP | |
|---|---|---|---|---|---|---|---|---|
| | Wt fraction | % E | Wt fraction | % E | Wt fraction | % E | Wt fraction | % E |
| 8 | 47 | na | 53 | na | 48 | 27 | 52 | 4.1 |
| 9 | 55 | na | 45 | na | 58 | 75 | 42 | 0 |
| 10 | 61 | na | 39 | na | 60 | 73 | 40 | 0 |

The extraction of the polymer dispersions and the physical blends by the procedures outlined above leads to the preferential extraction of the polymer dispersions component while the analysis of the residual SP component is only by a process of separation of the soluble component. Under these experimental conditions, it is possible that if the separation of the polymer dispersions for the SP component is not complete and the results of this analysis may be substantially inaccurate.

An alternate analytical procedure which relies on the separation of the SP component from the residue of the polymer dispersions is described to resolve any remaining doubts about the direction of the results. The separation of the SP component from the polymer dispersions is achieved by exclusively vulcanizing the latter to form an insoluble component from which the former is separated by extraction with a solvent at the appropriate temperatures. The vulcanization procedures are chosen so that the SP component is not vulcanized and the polymer dispersions is almost completely vulcanized. This condition is easily accomplished if (a) the polymer dispersions contains a diene incorporated into the backbone of the polymer in a concentration sufficient for the complete vulcanization of the polymer while the SP component contains none and (b) the vulcanization system is chosen to react readily and exclusively with the pendant double bond on the polymer dispersions. These conditions are fulfilled by the examples of the current invention which are compared to the corresponding comparative examples.

In the experimental procedure described below, the polymer dispersions contain a minimum of 3 wt % of the diene, 5-ethylidene-2-norbornene (ENB) and the vulcanizing agent is a mixture of 5 parts per hundred of polymer by weight of SP-1045, a phenolic resin curative made by Schenectady International, Inc., of Schenectady, N.Y., 1 parts by hundred of polymer of hydrated stannous chloride available from the Aldrich Chemical Co. of Milwaukee, Wis. and 10 parts per hundred of polymer of decalin as a solvent also available from the Aldrich Chemical Co. A 40 g sample of the polymer sample, being either one of the examples of the polymer dispersion which is the subject of the current invention or one of the comparative examples of the physical blends is introduced into the mixing chamber of a 60 cc Brabender Mixer attached to a PL-2000 mixer system all made by Brabender Instruments Inc. The mixer is maintained at 170° C. and the mixing rotors are turned at 15 rpm. Once the polymer is well mixed the ingredients of the vulcanizing system are added to the polymer and slowly mixed over 5 minutes to disperse the vulcanizing agents into the polymer. The temperature of the polymeric mixture is maintained as close as possible to 165° C. by the use of cooling air in the external jacket of the mixer. After 5 minutes a sample is removed and then pressed into a sheet of approximate dimensions 4"×4".

About 3.0 gms of this material is accurately weighed out and pressed onto a 400 mesh stainless steel mesh square about 6"×6" between sheets of Mylar, a protective film, and heated at 210° C. for 15 minutes with a force of 15 tons. During this time the SP-1045 and stannous chloride attack the double bonds of the polymer dispersions portion of the polymer containing the pendant double bonds to vulcanize this polymer. The SP component of the polymer which contains no double bonds is left essentially unaffected. The stainless steel square containing the adhered polymer film was introduced into a Kjeldahl extraction thimble and extracted under nitrogen with 500 ml of xylene, containing 200 ppm of Irganox 1076, at its reflux temperature of 140° C. The reflux action was continued for 36 to 48 hours to ensure complete separation of the component of the blend of the polymers into the soluble and insoluble fractions. At the end of this period the reflux was stopped and the soluble fraction of the polymer sample as well as the extraction thimble containing the residue.

The soluble polymer fraction was dried at 100° C. under vacuum to a constant weight and the weight fraction of the insoluble polymer was calculated from the difference of the original weight of the polymer sample and the weight fraction of the soluble polymer. A correction due to the extraction of the residues of the curative SP1045 with xylene, was applied to the weight of the soluble fraction prior to the calculation for the apportionment of the weight fraction of the soluble and the insoluble fraction. The analysis data is shown in Table 9 for two samples of the polymer dispersions and one sample of a corresponding physical blend. The physical blend is completely separated by this procedure into the respective soluble SP component and the insoluble crosslinked polymer dispersions. The separation in the case of the polymer dispersion is much less complete with the soluble fraction being much less than the amount of the SP component made in the first reactor. This is evidence for the improved miscibility in the polymer dispersion compared to the corresponding physical blend.

TABLE 9

Extraction of polymer dispersions and physical blends after crosslinking
(AE = amorphous elastomer, SP = Semicrystalline plastic component)

| Example | Blend type | Wt %: Soluble SP | Wt %: Insoluble AE | Synthesized SP/AE ratio |
|---------|------------|------------------|--------------------|--------------------------|
| 4A | Dispersion | 40 | 60 | 46/54 |
| 5A | Dispersion | 33 | 67 | 41/59 |
| 9 | Physical | 43 | 57 | 42/58 |

Stress-Strain Elongation Data for the Blends

The stress-strain elongation properties of the polymer dispersions and the corresponding physical blends was evaluated using dumbbell shaped sample. The dimensions and the procedures of the test are specified in ASTM. The samples were compression molded at 180° C. to 200° C. for 15 minutes at a force of 15 tons into a plaque of dimensions of 6"×6". The cooled plaques were removed and the specimens were removed with a die. The stress strain evaluation of the samples was conducted on an Instron 4465, made by Instron Corporation of 100 Royall Street, Canton, Mass. The digital data was collected in a file collected by the Series IX Material Testing System available from Instron Corporation and analyzed using Excel 5, a spreadsheet program available from Microsoft Corporation of Redmond, Wash.

The data for the polymer dispersions shown in Table 10 below was compared to the corresponding comparative examples of physical blends also shown in Table 10. Table 10 shows the modulus for each of the blends, either the polymer dispersions of the current invention or the physical blends of the comparative examples, at elongations differing by 10%. Shaded areas of the data table indicate that no modulus data for the sample was collected since the sample ruptured. Clear areas of the data table indicate the lack of data since the elongation of the sample was greater than the limits of the extension of the extensometer of the Instron. Typically blends with greater than 700% to 900% elongation would not rupture before the limits of the elongation were reached.

Physical blends of polymer dispersions and a SP component, as shown in the comparative examples, display poor stress-strain properties. In general, the physical blends of these materials easily distort under the specified test conditions and fail by rupture at comparatively low elongations of less than of 200%. This is believed to be due to mutual incompatibility of the component polymers. Deviation from this expected pattern of stress strain data indicates differences in the molecular architecture of the polymers.

Polymer dispersions of the same polymer the essentially the same composition ranges and blend ratios as the physical blends inlicate significantly greater elongation and tensile strength. This data is shown in Table 10 which compares the stress-strain properties of a set of polymer dispersions and comparable physical blends. Shaded area of the table indicate that that the sample broke during the test while clear areas of the table indicate lack of data since the extension of the sample was beyond the recording limits of the extensometer. The data clearly indicates the superiority of the polymer dispersions in this critical area of stress-strain properties. This is also clearly shown in the representation of the data in FIG. 1.

TABLE 9

Stress-Strain data for polymer dispersions and comparable physical blends.

| % extension | Modulus for Samples (psi) | | | | | | | | |
|---|---|---|---|---|---|---|---|---|---|
| | 4A | 4B | 4C | 5A | 5B | 5C | 5D | 9 | 10 |
| 10 | 770 | 397 | 423 | 399 | 288 | 256 | 321 | 1091 | 579 |
| 20 | 809 | 490 | 531 | 447 | 367 | 326 | 404 | 1027 | 501 |
| 30 | 803 | 537 | 578 | 462 | 400 | 368 | 447 | 858 | |
| 40 | 803 | 558 | 593 | 468 | 420 | 388 | 466 | 796 | |
| 50 | 807 | 568 | 597 | 472 | 430 | 399 | 475 | 160 | |
| 60 | 813 | 572 | 597 | 475 | 434 | 406 | 479 | | |
| 70 | 819 | 572 | 595 | 478 | 436 | 410 | 481 | | |
| 80 | 824 | 572 | 593 | 482 | 438 | 412 | 481 | | |
| 90 | 829 | 570 | 591 | 485 | 438 | 415 | 481 | | |
| 100 | 833 | 569 | 589 | 488 | 439 | 416 | 481 | | |
| 110 | 837 | 568 | 588 | 491 | 439 | 418 | 481 | | |
| 120 | 840 | 568 | 587 | 494 | 440 | 420 | 482 | | |
| 130 | 843 | 568 | 587 | 497 | 441 | 422 | 482 | | |
| 140 | 843 | 568 | 587 | 500 | 442 | 423 | 484 | | |
| 150 | 844 | 569 | 589 | 502 | 443 | 425 | 486 | | |
| 160 | 844 | 570 | 591 | 504 | 445 | 427 | 488 | | |
| 170 | 843 | 572 | 592 | 506 | 447 | 429 | 490 | | |
| 180 | 841 | 573 | 595 | 508 | 449 | 432 | 493 | | |
| 190 | 837 | 576 | 597 | 509 | 452 | 435 | 496 | | |
| 200 | 833 | 578 | 600 | 511 | 455 | 437 | 500 | | |
| 210 | 825 | 582 | 603 | 511 | 458 | 440 | 504 | | |
| 220 | 813 | 585 | 607 | 511 | 462 | 444 | 509 | | |
| 230 | 792 | 589 | 612 | 512 | 465 | 449 | 513 | | |
| 240 | | 593 | 617 | 511 | 470 | 453 | 519 | | |

TABLE 9-continued

Stress-Strain data for polymer dispersions and comparable physical blends.

| | Modulus for Samples (psi) | | | | | | | |
|---|---|---|---|---|---|---|---|---|
| % extension | 4A | 4B | 4C | 5A | 5B | 5C | 5D | 9 | 10 |
| 250 | | 598 | 622 | 511 | 475 | 458 | 524 | | |
| 260 | | 602 | 628 | 509 | 480 | 463 | 530 | | |
| 270 | | 607 | 635 | 508 | 487 | 469 | 537 | | |
| 280 | | 613 | 642 | 505 | 493 | 474 | 545 | | |
| 290 | | 619 | 650 | 502 | 500 | 480 | 552 | | |
| 300 | | 626 | 660 | 497 | 508 | 488 | 560 | | |
| 310 | | 634 | 669 | 490 | 516 | 495 | 570 | | |
| 320 | | 642 | 679 | 481 | 525 | 503 | 582 | | |
| 330 | | 652 | 691 | 468 | 535 | 511 | 593 | | |
| 340 | | 663 | 704 | 438 | 546 | 521 | 605 | | |
| 350 | | 675 | 718 | | 558 | 532 | 619 | | |
| 360 | | 689 | 733 | | 572 | 543 | 635 | | |
| 370 | | 704 | 751 | | 585 | 553 | 650 | | |
| 380 | | 720 | 768 | | 601 | 566 | 669 | | |
| 390 | | 738 | 788 | | 617 | 580 | 689 | | |
| 400 | | 758 | 811 | | 634 | 593 | 708 | | |
| 410 | | 781 | 833 | | 654 | 607 | 729 | | |
| 420 | | 804 | 858 | | 671 | 624 | 753 | | |
| 430 | | 828 | 887 | | 691 | 638 | 776 | | |
| 440 | | 853 | 917 | | 713 | 654 | 802 | | |
| 450 | | 882 | 950 | | 734 | 670 | 829 | | |
| 460 | | 914 | 982 | | 759 | 687 | 858 | | |
| 470 | | 950 | 1016 | | 784 | 706 | 887 | | |
| 480 | | 986 | 1050 | | 810 | 724 | 920 | | |
| 490 | | 1026 | 1088 | | 836 | 743 | 953 | | |
| 500 | | 1069 | 1128 | | 864 | 765 | 994 | | |
| 510 | | 1119 | 1170 | | 895 | 784 | 1035 | | |
| 520 | | 1177 | 1219 | | 926 | 805 | 1075 | | |
| 530 | | 1236 | 1263 | | 961 | 827 | 1119 | | |
| 540 | | 1301 | 1314 | | 995 | 852 | 1164 | | |
| 550 | | 1371 | 1367 | | 1029 | 878 | 1207 | | |
| 560 | | 1448 | 1419 | | 1066 | 903 | 1256 | | |
| 570 | | 1531 | 1470 | | 1103 | 932 | 1320 | | |
| 580 | | 1795 | 1515 | | 1137 | 963 | 1477 | | |
| 590 | | 2187 | 1555 | | 1180 | 996 | 1701 | | |
| 600 | | 2539 | 1656 | | 1260 | 1032 | 1982 | | |
| 610 | | 2791 | 1895 | | 1384 | 1067 | 2242 | | |
| 620 | | 2945 | 2171 | | 1552 | 1111 | 2474 | | |
| 630 | | | 2437 | | 1715 | 1164 | 2693 | | |
| 640 | | | 2667 | | 1898 | 1248 | 2917 | | |
| 650 | | | 2869 | | 2076 | 1378 | 3143 | | |
| 660 | | | 3052 | | 2249 | 1529 | 3367 | | |
| 670 | | | 3230 | | 2456 | 1692 | 3627 | | |
| 680 | | | 3408 | | 2635 | 1851 | | | |
| 690 | | | 3608 | | 2828 | 2004 | | | |
| 700 | | | 3818 | | | 2140 | | | |
| 710 | | | 4049 | | | 2273 | | | |
| 720 | | | | | | 2401 | | | |
| 725 | | | | | | 2470 | | | |

We claim:

1. A polymer dispersion essentially free of preformed or added compatibilizer comprising a substantially amorphous elastomer having a weight average MW of at least 20,000, and a semicrystalline plastic having a weight average MW of at least 20,000;

wherein said polymer dispersion has a dispersed phase comprising said amorphous elastomer or said semicrystalline plastic;

wherein said amorphous elastomer and said semicrystalline plastic are made from monomers selected from the group consisting of ethylene, C3–C30 higher alpha-olefins, a non-conjugated dienes, and combinations thereof;

wherein neither said amorphous elastomer nor said semicrystalline plastic has more than 0.2 vinyl groups per chain;

wherein said amorphous elastomer comprises 0–10 mol % diene;

wherein said semicrystalline plastic comprises 0–10 mol % diene; and wherein said polymer dispersion has a value of factor A which is less than 1, wherein said factor A is defined as the ratio of the linear dimensions of the dispersed phase of said polymer dispersion to the average linear dimension of the dispersed phase of a corresponding physical blend.

2. The polymer dispersion of claim 1 having a value of factor B greater than 2; wherein said factor B is defined as the ratio of the elongation at break for said polymer dispersion to a comparative physical blend.

3. The polymer dispersion of claim 2 having an elongation at break greater than 500%.

4. The polymer dispersion of claim 1, wherein the dispersed phase has an average diameter less than 0.7 μm.

5. The polymer dispersion of claim 1 wherein said amorphous elastomer comprises 5–95 wt % of the polymer dispersion.

6. The polymer dispersion of claim 1 wherein said semicrystalline plastic comprises at least 25 wt % of the polymer dispersion.

7. The polymer dispersion of claim 1 wherein said semicrystalline plastic has a heat of fusion higher than said amorphous elastomer.

8. The polymer dispersion of claim 1 wherein said semicrystalline plastic has a Tm greater than 60.

9. The polymer dispersion of claim 1 wherein said semicrystalline plastic consists of a polymer with a uniform intramolecular composition as determined by differential solvent extraction and has a PDI as determined by gel permeation chromatography of less than 5.0.

10. The polymer dispersion of claim 1 having crystallinity arising from a group consisting of stereospecifically polymerized polypropylene, and polyethylene copolymer.

11. The polymer dispersion of claim 10 wherein said semicrystalline plastic comprises greater than 80 wt % propylene.

12. The polymer dispersion of claim 10 wherein said semicrystalline plastic comprises greater than 65 wt % ethylene.

13. The polymer dispersion of claim 1 where the diene is chosen from a group consisting of ENB, DCPD, 1,4 hexadiene, MNB, norbornadiene, and ($\Delta$-11,12) 5,8 dodecene.

14. The polymer dispersion of claim 1 wherein said amorphous elastomer has a Tm less than 50 and a heat of fusion of 0–15 J/g.

15. The polymer dispersion of claim 1 wherein said amorphous elastomer consists of a polymer with a uniform intramolecular composition as determined by differential solvent extraction and has a PDI as determined by gel permeation chromatography of less than 5.0.

16. The polymer dispersion of claim 1 wherein said amorphous elastomer comprises 20–70 wt % ethylene provided that the ethylene content of said amorphous elastomer differs by at least 10 wt % from said semicrystalline plastic component.

17. The polymer dispersion of claim 15 wherein the ethylene content of said amorphous elastomer differs by at least 5 wt % from said semicrystalline plastic component.

18. The polymer dispersion of claim 1 wherein said amorphous elastomer comprises 20–70 wt % ethylene provided that the heat of fusion of said amorphous elastomer differs by at least 10 J/g from said semicrystalline plastic component.

\* \* \* \* \*